US010754326B2

(12) United States Patent
Samid

(10) Patent No.: US 10,754,326 B2
(45) Date of Patent: Aug. 25, 2020

(54) PROVING MATERIAL IDENTITY WITH QUANTUM RANDOMNESS—FINANCIAL AND GENERAL APPLICATIONS

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 16/578,341

(22) Filed: Sep. 22, 2019

(65) Prior Publication Data
US 2020/0033834 A1    Jan. 30, 2020

Related U.S. Application Data

(63) Continuation-in-part of application No. 15/898,876, filed on Feb. 19, 2018, now Pat. No. 10,467,522.

(60) Provisional application No. 62/805,369, filed on Feb. 14, 2019, provisional application No. 62/813,281, filed on Mar. 4, 2019, provisional application No. 62/782,301, filed on Dec. 19, 2018, provisional application No. 62/850,720, filed on May 21, 2019, provisional application No. 62/857,898, filed on Jun. 6, 2019, provisional application No. 62/900,567, filed on Sep. 15, 2019.

(51) Int. Cl.
*G05B 19/4099* (2006.01)
*H04L 9/30* (2006.01)
*H04L 9/08* (2006.01)

(52) U.S. Cl.
CPC .......... *G05B 19/4099* (2013.01); *H04L 9/088* (2013.01); *H04L 9/30* (2013.01); *G05B 2219/49023* (2013.01)

(58) Field of Classification Search
CPC ...... G05B 19/4099; G05B 2219/49023; H04L 9/088; H04L 9/30
See application file for complete search history.

(56) References Cited

U.S. PATENT DOCUMENTS 10,467,522 B2 * 11/2019 Samid .............. G06F 21/602
2018/0351917 A1 * 12/2018 Samid .............. H04L 9/0838

* cited by examiner

Primary Examiner — Seung H Lee

(57) ABSTRACT

Capturing randomness in the chemical structure of a lump of matter, which then can be easily and quickly measured to read that randomness and thereby recapture it as bit-wise randomness, applicable as (i) a source of randomness, and as (ii) a means to verify the claimed identity of a material article.

10 Claims, 21 Drawing Sheets

Multi Point Resistance $R = (V_p - V_q) / I$

IVA Manufacturing Scheme

Coonstruction Protocol

A subnetwork of IVA sharing Stations

MIV Supported BitMint Mint

Quadruple IVA Coin Accounting

Built-In Central Radiation Source IVA

Applying an External Radiation Source

Multi Point Resistance $R = (V_p - V_q) / I$

Coin Logger Side View

Coin Logger Anatomy

ǫcoin Verifier top and bottom assembly

Ro-Coin in a Verifier Box

Identity and Data IVA Authentication

Identity and Data IVA Authentication

IVA as Asecure Enclosure (a)

(b)

(C)

Tethered IVA Coins

PROVING MATERIAL IDENTITY WITH QUANTUM RANDOMNESS—FINANCIAL AND GENERAL APPLICATIONS

This application is filed as Continuation in Parts of U.S. patent application Ser. No. 15/898,876

CROSS REFERENCE TO RELATED APPLICATIONS

Provisional Application No. 62/782,301 filed on Dec. 19, 2018; Provisional Applications No. 62/805,369 filed on Feb. 14, 2019; Provisional Application No. 62/813,281 filed on Mar. 4, 2019; Provisional Application No. 62/850,720, filed May 21, 2019; Provisional Application No. 62/857,898 filed 6 Jun. 2019; Provisional Application No. 62/900,567 filed on 15 Sep. 2019.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BRIEF SUMMARY OF THE INVENTION

Constructing a material lump from a set of constituent materials aggregating in distinct volumes such that each volume contains one constituent material, which has properties distinct from the materials in contiguous volumes, and by selecting the contents of these volumes randomly, then the integrated measurement of such properties with regard to the lump as a whole reflects that randomness. Thereby (i) the identity of the lump can be ascertained with such integrated measurement, and (ii) the lump may be regarded as a robust container of random data, expressed off the digital grid (and hence unhackable). The invention specifies particular properties which can be measured non-invasively from outside the lump, and where the properties of each volume affect the reading of the integrated measurement. The proof of identity per easy measurement of the lump can be used to ascertain the validity of minted coins, or the validity of any claimed valuable properly attached to the constructed lump.

BACKGROUND OF THE INVENTION

As cyber space proves to be fundamentally vulnerable, despite considerable cryptographic and security efforts, it is necessary to realize that bit-wise data cannot be adequately protected from attack, and hence it is necessary to provide material moorings to cyber ships, which means to express data off the digital grid inherently in a non-hackable lump of matter. Technological options are being developed, this invention is one of them.

A randomly constructed lump of matter is identified via superficial measurements affected minutely by its structure.

Specification. Utility patent application by Gideon Samid, September 2019

Normally material items may be duplicated and counterfeited, which is unacceptable for coins, and other valuables. We propose to construct such items using nanotechnology, (e.g. 3D Printing) technology fed by quantum randomness, and then measure the construction through the surface of the construction, mostly without distorting its structure. These measurements reflect the randomized make-up of the manufactured construction—the randomized lump. The printed lumps may be manufactured in a limited count; they will authenticate each other through comparing readings; even when stolen, the lumps resist duplications which makes them a good choice for high denomination coins, and as branding marks for various valuables. Such lumps also serve as a rugged source for random data so critical in various cyber security protocols, and also useful to establish a multi-mint digital currency environment.

INTRODUCTION

Anything material which is manufactured at will, can generally be copied with similar technology, so that the copy will pass as the original. That is how money counterfeiting works, and that is how brand names products are forged, and how fake stuff interferes with good order. We here address this challenge: striving for a technology to construct something material in a way that will make counterfeiting and unauthorized copy infeasible.

We denote the fake-resistant article as the identity-verifiable article (IVA). We argue that if the IVA is built via a formula, a specific manufacturing protocol, then the protocol may be stolen, or may be deduced upon examination of the IVA. That is because the manufacturing protocol contains less data than is needed to define the specific construction details outright. It is therefore important to manufacture the IVA on the basis of randomized input. By its very nature randomized input makes it impossible for one to find a manufacturing short-cut, and use it to duplicate the IVA. This implies that the construction of the IVA may be made as complex as desired, controlling the effort needed to figure out how to duplicate it. In other words, a randomized input will be used in a way that will pass its complexity and unpredictability (randomness) to the manufactured article.

We define here the basic methodology for manufacturing an IVA: Input comprised of random data and a set of manufacturing instructions to guide the IVA constructor how to use the random input data in the construction. The random data and the manufacturing instructions are used as input into a manufacturing process that manufactures the IVA.

We further require for the manufacturing process to build an IVA such that the identity of the random input into the process will be strongly correlated with some measurable properties of the IVA. These properties must be expressed by values that reflect the IVA as a whole. In other words, if the IVA is seriously deformed, or is broken, or splits, then the reading of the correlated properties will be different. We denote these correlated properties as the Identity-Properties, ID-properties, identity-readings, or ID-reading of the IVA.

We have described here a dynamics whereby random data (RAND) together with a manufacturing protocol (Protocol) are fed into a manufacturing process (MP, the Constructor) which generates an identity-verifiable article (IVA), wherein the identity of the IVA may be established by reading the values of certain properties (ID-properties) with an appropriate reading device (Property Reader, PR). We denote the reading device as the Properties-Reader, or simply the Reader. We denote the measurement of the ID-properties as the Reading, or Measuring process.

We denote the set of readings of the ID-properties as the signature of the IVA (Signature).

As described we have the basis for verifying an identity of an IVA. We consider a Claimer holding an IVA claiming it to be a particular IVA, evident in the material expression of the IVA, and claiming this material item to be an IVA identified through its known signature. We then consider a Verifier who is in possession of the signature of the IVA, and who can arrange for reading of the IVA, and reporting the results, the readings. The Verifier then compares these reading to the signature in his or her possession, and if there is an agreement between the signature and the reading then the Verifier agrees with the Claimer and issues a statement of verification of the identity of the claimed IVA.

We also consider a situation where two parties A and B, each holds a copy of the same IVA. Each can prove to the other that they hold that copy by comparing the readings of the same ID properties of their respective IVA.

It is because the input to manufacturing the IVA is random data, which may be made large enough, to limit the chance for a coincidental match of the many as desired readings of ID properties, that when the readings fit, the identity of the IVA is established with satisfying confidence.

We further consider the situation where there are r ID properties. The full signature of the IVA is comprised of the r readings of the r ID properties, but in each instant where a claimer lays a claim for the identity of an article, a different subset of p ID-properties, p<r is being measured and compared to the readings of the same properties as listed in the signature, and on the basis of the accurate reading of these p ID properties, the Verifier will issue his article-verification statement. Suppose we have r=t*p, then the article can be verified t times, each time use a different set of p ID properties. This way a man-in-the-middle that would eavesdrop on the communication between the Claimer and the Verifier will not be in position to exploit remote reading and cheat the Verifier by replaying previous readings. This relates to the case where the readings is carried out at the Claimer side and communicated to the Verifier via a communication channel that may be hacked. One could readily compute the chances for a coincidental duplicate based on the value of p, and the range of possible values for each of the p properties. One could then set it up to comfortable levels.

We further distinguish between destructive, Sticky and 'clean' (untraceable) reading modes. In a destructive reading the IVA is deformed, cracked, or broken and even destroyed. In a sticky reading the IVA is not destroyed but there are traces that indicate that reading took place, and a repeat reading of a certain ID property may or may not be feasible. In a clean mode there are no indications that reading of the ID properties took place.

Since the IVA is constructed with random feed, then its construction carries with it that randomized nature, and this randomness is further expressed in the signature of the IVA. The IVA thus, may be regarded as a source of randomness.

We denote the system and the procedure defined above as the Material Identity-Verification Protocol (MIV-protocol, MIVP) or MIVS (MIV system).

The IVA signature may be (i) hidden, and (ii) exposed. If the MIV-system is such that given the signature it is feasible to construct an IVA which will give the readings of the signature, then the signature should be hidden. Illustration: one constructs a random source to determine that the ratio between gold and silver of a particular piece of jewelry will be 1:0.235. If that ratio is known than a fraudster could melt a piece of jewelry that has that same ratio, and that fraudulent piece of jewelry will pass as the original (assuming in this illustration that the signature is comprised of one property). In this case, this will only work if the ratio gold-silver is kept as a secret.

If the signature is exposed, it is necessary for the MIV protocol to be one way. Namely it should be infeasible to construct a fake article that would give the readings of the signature. For example: one builds a piece of jewelry using a randomized mix of gold and silver. A small hole is drilled in the item of jewelry, through which a source of a given range of electromagnetic radiation is placed. In different locations outside the piece of jewelry one measures the radiation that penetrated through the jewelry. The set of such readings comprises the signature of the jewelry IVA. If the gold-silver mix is well randomized it is practically infeasible to use the known readings of the outside radiations, and on its basis construct a piece of jewelry that will give these very readings.

There is of course an enormous advantage to the exposed signature mode since this allows a community where such IVAs are passed around to verify the identity of the passed around IVA.

MIV Protocol Use Cases

We identify the following use categories:
1. Financial Applications
2. Article Tagging
3. Cryptographic Applications
4. Identity and Data Authentication
5. Secure Enclosure Financial Applications For financial applications we regard the IVA as a "coin". A mint can mint an IVA (a coin) assign it an arbitrary value, V, and pass it on to a trader. The coin will be redeemable per its par value—V. To redeem it, a trader will submit the coin for redemption. The mint will act as the Verifier, assure itself that it is the real coin because its reading will agree with the signature held in confidence perhaps by the mint. The mint will then pay the trader who submitted the coin for redemption, the redemption value, V. (minus any service fee adjustment).

The mint may not care who the coin redeemer is, the redemption is per the coin. This implies that the original trader given the coin by the mint could trade it, pass it along, and the recipient will again be able to pass it along as a valuable of the value V, because that is what the mint will credit the redeemer of the coin. Note: we discuss here an IVA issued against a promise to pay an amount of money, but in fact an IVA can be minted to express an obligation to give anything of transactional value, like a stock, a bond or a piece of real estate.

In order for a recipient trader to accept the coin as authentic, he may either trust the physical appearance of the coin, (as is the case with ordinary coins), or wish to measure some or all the ID properties versus a known signature, or part thereof. Based on the one-way attribute of the MIV protocol, (the exposed signature mode), knowledge of the signature cannot be used to manufacture a counterfeit IVA. This implies that the signature may be made public for every prospective payee of the coin to use it to verify the bona fide of the coin. The IVA will then function as a proper customary coin and be passed around and traded like banknotes and metal coins.

The IVA may be qualified coins—minted in conjunctions with a set of condition for redemption (tethered money). Such condition may limit the identities of the redeemer, the timing of redemption, etc.

The exposed signature trading mode will reconstitute the legacy cash mode, and it comes very handy in situations of natural or man-made disaster, or emergencies when no network connectivity exists, and all payment options relying on the Internet collapse.

Signature Exposure Strategy

In order for the IVA to function as a viable tradable coin it should be necessary for its payee to be able to quickly and conveniently verify the bona fide of the coin. This is done by comparing measurements of the coin to signature data. The signature then may be kept in secret within the mint, and every payee will measure the claimed coin and send the measurement to the Mint to receive a confirmation of its bona fide. The mint will compare the measurements to the signature data to issue its verification statement.

Based on the one-way attribute of the MIV, (the exposed signature mode) the signature may be made public, so any payee will be able to measure a paid coin and compare it to the public signature. This will allow payment without reliance on the Internet.

As described a fraudster could manufacture a counterfeit coin, which does not imitate the structure of the copied coin, but is constructed in such a way as to register the results of the measurements to fit the signature. The higher the value of the coin, the greater the incentive for a fraudster to construct such a counterfeit coin.

The way to combat this fraud, is to expose only a fraction of the ID properties to the public, and to keep the remaining data secret. The number of properties that are not publicly disclosed may be made high enough, s, so that each time a prospective payee asks for the mint to verify a claimed coin as payment, the mint identifies a subset of s, say $s_1$ ID properties for the prospective payee to measure. The mint then verifies this coin to the prospective payee if the prospective payee sends to the mint the readings of those $s_1$ properties and they match the signature data. Next time a prospective payee asks for verification of the coin identity, the mint will identify another set of ID properties $s_2$. The mint will use an estimate of how many times, t, a coin of a particular denomination will be transacted within the trading community, and select s such that:

$$s > s_1 + s_2 + \ldots s_t$$

If the number of requests t is too high, and there are no more secret properties left, then the mint so notifies the payee who may reject the coin, and request the payer to redeem it with the mint, namely to physically pass the coin to the mint for redemption, or possibly exchange with a coin of same denomination but with a new set of s undisclosed ID properties values.

Minting Services

The IVA may serve as a mint in the context of the BitMint digital money system. The BitMint digital money system uses quantum randomness as raw material to mint its coins, and that randomness is then used to redeem a BitMint digital coin submitted for redemption. Instead of checking the data in a regular database the mint could check the data through readings of the IVA. Namely using the IVA as a source of unhackable randomness.

The MIV system could be used as a means of building sub-mints for local use. A bank may purchase from a mint an IVA coin of a value of V=$25,000,000. The coin has c bits in a row, as indicated by a particular order of its ID readings. These c bits may be parceled out as individual BitMint coins to be traded in the bank's environment. These local traders will be reassured that the money they trade, which for all traders amount to the value V of a BitMint coin, will be redeemable and available as long as the physical IVA is in the hands of the bank. The BitMint dispensed coins based on a large denomination IVA may be traded through a blockchain mechanism if so desired. Regular BitMint mint keeps its coin data in a regular database. An IVA BitMint will keep the coin data in the IVA. The database that writes the coin is comprised of high quality random data, which is exactly what the IVA readings are. (given that the randomness that was used in the construction of the IVA is of high quality).

IAV Secured BitMint Mint

The BitMint mint is based on a large array of high quality randomness. If the integrity of this mint randomness is damaged, the entire currency realm minted by that mint goes dark, or becomes under a sever shadow that would hamper all commerce with that currency. A normal bit-wise database is always at the risk of assault. And while back-ups seem to be effective counter measures, they also are vulnerable to hacking. The Material Identity Verification Technology, MIV-T, offers the BitMint mint, as well as other systems relying on the integrity of random data the unhackable storage and handling of such random data. Since the IVA holds the random data in non-bit format, implicitly in the chemical bonds of the material, it is not vulnerable to hacking, and in case of BitMint will serve as the security foundation of the mint.

We may construct a sequence of randomness arrays beginning with the IVA. The IVA is placed in an IVA-Reader, extracting the random values from the IVA in a specified order, and creating a randomness base (R-Base) written bit-wise. The R-Base then serves as a source to build the Mint-Base (M-Base), a sequence of random bits taken from the R-Base in a specified way. While the R-Base may be written as a multi dimensional array, the M-Base is written in a specific sequence. It is that sequence which is then cut out section by section as the BitMint mint requests a specified number of random bits to mint its next coin. The requests for randomness for coins is logged in a coin-request ledger (CRL), which specifies the id of the coin (as submitted by the mint), the ordinal count of the first bit in the bit sequence that is sent from the M-base to the BitMint mint, and the ordinal number of the last bit sent from the M-base to the BitMint mint for the specified coin. The CRL will allow for subsequent examination of the Mint (including its coin-base, C-base, which is the data array that captures all the minted coins, with their exact line-up of random-bits, and which is the array (database) used to authorize redemption of coin submitted for redemption).

There are two modes of randomness integrity review: (i) on demand, and (ii) routine. The on-demand case occurs when there is any problem or dispute about the content of the C-Base. One recalls that the C-Base is a live database, facing the trading public. Despite all precautions a certain hacker may penetrate to it and change the content of the coin-base. This will cause a problem upon some attempts to redeem a certain coin. The BitMint mint then will initiate an on-demand review in which the CRL will be invoked to compare the contents of that coin in the mint with the contents of the respective section of the M-base. Any inconsistency may be resolved in favor of the M-base; or for maximum precaution, one traces the respective randomness in the R-Base, from which it was extracted. One can go further, and invoke the sequence that was applied to read the IVA to that section of the R-base. The reading of the IVA is the absolute decider of any dispute, because the IVA data is not bit-wise format, and can't be hacked, all the rest are bit-wise.

In order to detect any foul play with the data in the coin-base, the back checking on the coin-base towards the mint-base and then the randomness base will be carried out ever so often. Any inconsistency will have to be (a) removed with priority for the IVA reading and (b) investigated to track its origin.

Should an IVA be exhausted, a new IVA will have to be added.

Hierarchical Minting

Complexity by its essence is vulnerable to surprises which remain undetected, and even unsuspected until they happen, simply because the complexity defies analytic efforts to spot all the probable scenarios. And for that reason many complexities are managed through ready-to-disengage subunits that are designed to prevent a total catastrophic avalanche. Currency and payment is an essential social dynamics, which is quite complex, and thus may warrant a disengagement-ready configuration. Such a configuration is readily possible with the IVA.

We describe hierarchical minting where a master mint is minting digital money through a hierarchy where the leaves are nodes that mint digital money to a restricted sub community. The community minted money will be valid throughout the hierarchy, but the distinct minting environment will allow for quick disengagement should one be warranted.

For matters of simplicity we describe a limited hierarchy. The following description is readily extended to a more involved hierarchy. A master mint, M is controlling two sub-mints U and V. Sub mint U is controlling three sub-sub mints A, B, and C and sub-mint V is controlling three sub-mints D, E, and F.

Mints A, B, C, D, E, and F mint digital coin, each to its assigned community of traders. Using MIV technology the master mint M manufactures 3 copies of 6 IAV 'rocks'. (18 rocks altogether). These IAV are a, b, c, d, e, and f. Each of the 6 bottom mints get its respective IAV a to A, b to B, c to C, d to D, e to E, and f to F. Mint U gets copies of IAV a, b and c and mint V gets copies of IAV d, e, and f. The master mint keeps a copy of all six IAVs.

Mints A, B, C, D, E, and F use their IVA to extract randomness and mint BitMint coins to their respective community. All trade within the community is resolved with the respective mint. Payment from say community A to community B is resolved by the recipient in B submitting the A coin to his B mint. The B mint contacts the A mint to redeem the coin, and when done, mint B exchanges the A coin to a B coin given to the member of the B community who submitted his A coin for redemption. The mints may settle their mutual payments on a wholesale basis, every so often, not necessarily coin by coin.

Mint U and V can readily take over the trade of their respective sub mints because they have a copy of their IVAs, and the master mint can take over for all its subunits having copy of all IVAs. The mint-bases and the coin-bases are also copied upwards in the hierarchy.

Tethered IVA Coins

Using a tagged IVA as a coin of a declared denomination may be extended to full fledged coin tethering, namely to attaching to the coin a wealth of meta data to indicate chain of custody, terms of redemption by the mint, and such like. This meta data can be accumulating by each successive owner of the IVA coin where the methodology of layered signatures used in blockchain will be applied to the meta data to insure the authenticity of its contents.

Specifically, the mint will issue a coin with a coin-id, a declared value, and any related information. All this tethered data will be written to the data element of the coin, the authenticity of which is secured by the measured identity of the IVA portion of the coin. The writing of the mint will be signed by the mint. The mint will pass the coin to the first trader and indicate the public key of that trader, as well as the time of coin transfer, and perhaps location, per GPS data. Then the mint will sign the entire meta data with its private key. The first trader when passing the IVA coin to the next trader will specify the time of the transfer (location too perhaps) and the public key of the second trader now to own the coin. Everything written by the first trader will be signed by her with her private key. Alternatively each trader will sign the entire meta data on the coin regardless of who wrote any part of it. This sequence will apply from one trader to the next until the last trader submits the coin to the mint for redemption. The mint then will check the chain of custody to determine proper trade before redeeming the coin. It will check if the coin satisfies all the conditions for redemption specified as part of the coin meta data.

Article Tagging

The IVA may be secured within a 'tagged article' (TA), such that it would be infeasible to replace it with another IVA without causing visible damage to the TA or the IVA. For example the IVA may be fit within a sealed enclosure, SE, such that the seal will have to be broken for the IVA to be replaced, or pulled out. Yet the fitting of the IVA in the TA will not hinder the readings of the ID properties of the IVA. These readings may be compared to a public or secret signature, as the case may be, and when the reading and the signature agree, the TA is regarded as authentic, not a counterfeit.

Cryptographic Applications

Since the manufacturing of the IVA is carried out with randomness as input, it is possible to regard the signature as random data. Randomness is a universal 'fuel' in virtually every cryptographic protocol, and thus, it is possible for some n communication parties, to use n duplicates of the same IVA to mutually authenticate themselves to each other, and then to securely communicate with each other.

Authentication: Let Alice and Bob each have a copy of the same IVA, namely they have two IVAs with the same signature. The two IVA were manufactured with the same string of random bits as input, and then that string was erased. Alice will call upon Bob and claim to be Alice. Bob will then randomly select a set of $s_1$ ID properties, and ask Alice to provide their values. Bob, at his end, will measure the values of the same $s_1$ ID properties, and then compare his readings to the communication from Alice. If the results agree, Bob will authenticate Alice as the Alice who holds the IVA. Alice and Bob will then exchange roles, and Alice will randomly select different ID properties, $s_2$, to compare her readings of her IVA to the data sent over from Bob.

The procedure can readily be extrapolated to a party of n>2 participants, authenticating themselves to each other. This protocol is best practiced when the holders of the IVA don't keep a regular hackable database with the signature data, but resort to measuring the signature data each time around.

Every cryptographic protocol that is based on some shared randomness can be executed with the IVA serving as the source of the shared randomness. A writer of a message within a set of n communicating parties will use a key K to encrypt a message to be read by the parties in the set. The writer will then randomly choose a subset of the signature, $s_w$ ID properties and indicate that the readings of these properties have served to define the cryptographic key used to encrypt her message. If the used cipher is symmetric then all parties extract the shared key from their respective IVA.

Some cryptographic applications call for unilateral randomness, not shared with any party a-priori. For such application it is best to use an IVA with no duplicates.

In extracting random data from an IVA, the specification of properties to be read may by done in an arbitrary manner, or by a random selection (using same or different source of randomness), or by an algorithmic specification shared by the parties. Such algorithmic specification may be in the open because the secrecy is in the reading, not in the identity of the ports.

Identity and Data Authentication

The technology used to insure authenticity of identity and data is moving ahead, but so does the counterfeiting technology. In our integrated world it becomes more crucial to be able to authenticate personal details, or some general data elements. Cards, passports, and nominal electronics are all subject to counterfeiting. The MIV technology can be called up to help.

One simple way is to do is to envelope an electronic data piece (EDP) with an IVA. The IVA will be authenticated through its randomness reading which will be compared to a public ledger containing the expected reading results. The authentication of the enveloping IVA will be extended to the enveloped EDP. The EDP will be a write-once, read-many option with an electronic outlet through the enveloping IVA so that its content can be read and trusted.

We call this contraption 'Secure Envelope' (SE). It may be used as personal id devices. Replacing perhaps ordinary passports, and other identity cards. The information in the EDP may be anything that is found in a comparable regular ID. The SE can be used to authenticate animals, art work and any other devices.

The fraud path for the SE is to separate the EDP from the enveloping IVA. The IVA cannot be replaced because its reading data is kept in countless copies of the public ledger, but the EDP may be replaced with a fraudulent piece of data. To counter this option it is necessary to devise physical integrity solutions. If the enveloping IDA is 3D printed around the EDP, with no opening option then one would have to split the envelope, exchange the EDP and then glue the envelop parts back together again. This can be negated by using the technology described in U.S. Pat. No. 4,711,906 whereby the material of the IVA is extensively crackable, so any attempt to split the IVA open will lead to many irregular pieces that will be very difficult to glue back together. A simple inspection will reveal that the IVA has been glued and its integrity suspected.

Secure Enclosure

An IVA will be molded as an envelope housing anything of value or of need of trust and authentication, regarded as the "payload". The payload may be money, gold, an artifact of art or history. The IVA envelope will be placed around the payload such that any tampering will be clearly visible and/or result in distortion of the readings of the IVA properties.

The IVA envelope may be constructed of a sheer material (or part of the IVA may be constructed from a sheer material) so that a holder of the contraption will see the payload through the IVA envelope.

The holder of such a secure enclosure will be able, at will, subject the IVA envelope to a test of authenticity through reading its properties. Alternatively, the secure enclosure can be placed in a property reader which will frequently initiate a test of authenticity, which may be carried out each time, using different properties. The manufacturer of the secure enclosure will be able to remotely initiate authentication tests, randomly or at any specified frequency, assuming the property reader is remotely connected.

The payload may be viewed via a camera inside the envelope. The payload could broadcast through the envelope any data stream including video.

Implementation Technology

From a technological standpoint we need to address (i) the construction of the IVA, and (ii) the measurement of the ID properties, and (iii) incorporating the MIVS in the host environment.

We discuss a categorical implementation of the MIV on the basis of James Maxwell equations of electromagnetism. The essence of Maxwell (and Faraday) discovery is the complex interaction between electrical charges in motion and electric and magnetic fields. While the charges may be localized, the respective fields are environmentally spread. This implies that a lump of matter containing 'loose electrons' as in metals will be affected by some combination of electrical and magnetic fields, effected from outside that lump, and the impacted 'loose charge' will gain motion, which in turn will generate an electromagnetic disturbance which will interact with the originally applied fields, to combine into particular electromagnetic field values, which can be reliably measured. In other words, we have here a situation where the internal structure of the lump creates a reading outside the lump which is characteristic of the inner structure of the lump. This reading may be regarded as an ID property of the lump. By applying a variety of instigating combinations of electrical and magnetic fields, the measured lump will respond each time in ways that reflect its structure. By applying r distinct combinations of such instigating electromagnetic combinations, one will measure r distinct readings characteristic of the measured lump. To the extent that the lump was constructed via random data, the readings of the r properties will be randomized too. Similarly this would work with radiation scattering and radioactive processes.

Construction of the IVA

The MIVS may be based on (i) destructive reading, (ii) sticky readings, and (iii) clean reading. The third option is of the higher interest because it can be repeated indefinitely.

The idea of the MIVS is to devise a fast and easy reading of a property of a lump of matter (the IVA), and to construct the lump such that the values of such reading will be randomized. The non-destructive reading is taken from outside the IVA, with contact to at most, the surface of the lump, not incurring an invasive drill. It therefore that the chemistry is not nearly as relevant as physics.

We are looking into relevant aspects of physics: (i) gravity, (ii) classic, "Maxwellian" electromagnetism, (iii) quantum physics. Gravity can be coupled with buoyancy where the mass, m of a lump and its volume v determines its buoyancy. One could then device a liquid of specific gravity p, such that a particular IVA will be in a balanced floating position. Or one could measure the quantity of a light or heavy material to be attached to the IVA to insure that in given liquid the combined IVA and the attachment will be in perfect float. If the result of such experiment is kept secret, then this reading may qualify to authenticate the identity of an IVA. However, if the result of the experiment is leaked, or hacked, then it would be easy for a fraudster to construct a fake IVA that would pass the buoyancy test. A drawback. One may also note that it is not very easy or very fast to carry out such a test.

Maxwellian IVA Methods

James Maxwell and Michael Faraday have shown and specified the remarkable interaction between electrical fields, charged particles and magnetic fields. These interactions may be utilized to impact an IVA with a "Maxwellian Disturbance", let this disturbance interact with the electrical aspects of the probed IVA, and then measure the outcome of this interaction. The specific construction of the IVA will be reflected by the various electromagnetic readings from the ambience of the IVA.

We discuss two categories: (i) electromagnetic interference, (ii) electrical measurements. In the first category the reading involves some radiation that interacts with the IVA, and in the second category the reading is carried out through applying potential differences over given points on the surface of the IAV, and then reading the resultant current.

US patent application for "MIXFIX: fine-tuned graded mixing/entropic alphabet for chemical and visual encoding, efficient processing, and decorative painting patent application (Application #20080144432)" describes a means to mix distinct viscous materials to a controlled degree of mixing, which means to a controlled degree of bulks and contiguous zones of desired size, as is desired for an IVA.

Electro Magnetic Interference

The considerations here are like the ones for nuclear radiation. It involves a source of electro magnetic radiation with a certain frequency pattern. The emitted radiation encounters the IVA and reacts according to its structure. Certain detectors strategically placed around the IVA will read the resultant radiation, reflective of the IAV randomized structure.

While nuclear radiation is only absorbed or scattered, the electromagnetic situation may involve activated parts within the IAV, which will react as secondary source and will contribute to the resultant reading. Such are ferromagnetic materials randomly distributed within the IAV, and specially placed wires where the probing involves passing current through them, thereby creating electro-magnetic interference, commensurate with the rate in which that induced current changes. By allowing random input to spread quantities of iron, cobalt, and nickel within an IVA, (as an example) the resultant field in the ambience of the IVA will be responsive to that distribution of ferromagnetic elements in the IVA.

The radiation may be of any frequency or combination of frequency; it may be a regular source or a laser. It may be singular or plural. The radiation source may indirectly in the form of an alternating current in a strategically placed coil inside or close to the IVA.

Electrical Measurements

Electrical measurements are very convenient. The IAV may be fitted with n ports, where a port is a location on the IAV where an electric potential may be applied. Let us apply potential $V_p$ to p ports on the IAV and keep them connected, and apply potential $V_q \neq V_p$ on q points on the IAV and apply them connected too. We shall assure that:

$$1 \leq p < n, \text{ and } 1 \leq q < n, \text{ and } p+q \leq n.$$

The p points and the q points close a circle and the potential difference: $\Delta V = V_p - V_q$ will generate a current I. The value of I depends on the distribution of material of variant conductivity within the IAV. If these materials of varying conductivity are distributed in random "blocks" within the IAV then the reading of I will be randomized. The ratio $r = \Delta V/I$ will be computed as the resistivity of the IAV under the circumstances of the reading.

The number of possible such reading is very high even for a small number of ports, (small n):

$$N = \sum_{q=1}^{n-1} \sum_{p=1}^{n-1} C_n^p C_n^q$$

The large number of readings is very useful in a protocol where the identification information should be different every time it is communicated in a network, and also very useful when regarding the IAV as a source of shared randomness. The extraction of as much randomness as desired will happen by measuring the IVA time and again, each time with another combination of p ports and q ports.

The described setting may be made more involved by applying a secondary current between two groups of ports p' and q' which are not part of the p or q ports. That current might make an impact on the readings of the IAV, and thereby supply many more reading values.

Measurement of ID Properties

Measurement of ID properties is carried out via proper detectors. Because the measurements depend on the geometry of the IVA, the positions of the detectors must firmly be established. The measurement of electromagnetic events like radiation intensity and electrical current are analog in nature, and must be mapped to digital readings with great accuracy. This is done according to the specifications outlined in application Ser. No. 15/898,876 "Rock of Randomness"—the application of which this one is a continuation.

Randomness Extraction

We describe a setup to extract randomness from an IVA comprised of randomized internal zones of constituent materials that differ from each other in their electrical conductivity. The article (the lump, the rock) is fitted with n electrical ports, each can be applied a certain electrical potential. A property of the IVA is defined as the electrical resistance of the IVA under the condition that p specified ports are applied potential $V_p$, and q specified ports are assigned a potential $V_q$. The p ports are electrically connected, and the q ports are electrically connected. The effective resistance between the p ports and the q ports leads to a certain current I=I(p,q) that is measured, and then used in computing the resistance as $\rho = (V_q - V_p)/I$. ρ is then reduced to a representative integer as described in the application this one is the continuation of, (Ser. No. 15/898,876) $\rho \rightarrow \rho^*$, and $\rho^*$ is then computed to a modular value, r between 0 and R−1: $r = \rho^* \bmod R$. r is regarded as randomized value reflecting the randomized construction of the lump (the IVA) and the particular selection of the p ports and the q ports. r may be written in binary alphabet as a binary string. p and q are selected under the conditions: $0 < p, q < n, p+q \leq n$.

The way to extract randomness from the IVA is to measure the IVA with a particular choice of p ports and q ports, computing the respective r value, then adding the r binary string to the growing binary string, the extracted binary string (EBS). The EBS starts as the null string. The first choice of p and q ports creates the first r string, which is added to the (empty) EBS. Then another choice of p and q ports is made and another measurement of an r value is being issued, the new binary expression of this r string is added to the EBS, and so on for as long as there are additional combinations of p and q ports, or until the EBS is long enough.

We present ahead one particular way to create the EBS, based on randomized transposition.

Using the procedure described in the Equivoe-T patent application (Ser. No. 14/714,328), one would identify the n ports of the IVA with ordinal count: 1, 2, . . . n. Then one would arbitrarily choose p ports and q ports, and choose a "remover" value, RMV, an arbitrary positive integer. One would measure the IVA with the chosen p and q ports and extract the bit string of the result to start building the EBS. One would then line up the p ports, followed by the q ports, to create an ordered list of (p+q) ports. One would then apply the remover RMV according to the procedure in Equivoe-T patent application, (Ser. No. 14/714,328) and compute a permutation of this (p+q) line up. The first |p| ports in the new line-up (new permutation) would be regarded as the new p ports, and the rest as the new q ports, and now the measurement of the IVA will be carried out over the new p and q ports categories. The result will be extracted as a binary string which will be added to the growing EBS string. Then the remover, RMV will be applied on the current permutation to create a third permutation. The first |p| ports in the new line-up will be regarded as the new p ports and the rest as the new q ports. These new ports assignments will be used to measure the IVA, and extract more random bits to be added to the EBS and so on, the RMV is applied again to create a new permutation and continue to build the EBS.

Note: the term |p| signifies the integer which represents the number of p ports.

Illustration: An IVA is marked with 7 ports: a,b,c,d,e,f,g. We select ports a,b,c as the p group and ports d,e,f,g as the q-group. We use this setting to measure the IVA, the reading of the effective resistance of the IVA under these terms is $\rho=18.3$ (in some specified units). We decided to interpret the reading as modular $2^3=8$ (it is advantageous to select the modular value as a power of 2). Accordingly the reading of the IVA is $\rho \rightarrow \rho^*$: 18.3→18, leading to r=$\rho^*$MOD 8=2. r is then written in binary as "10", which then becomes the first string in the EBS="10". Using the remover RMV=5 (no "ghosts") with the Equivoe-T procedure, the permutation a,b,c,d,e,f,g becomes: e, c. b, d, g, a, f. We now select the first |p|=3 ports as the new p-group (e,c,b), and the rest (d,g,a,f) as the q-group. With this new setting we measure the IVA and get a reading $\rho=46.4$, which we round up to $\rho^*=46$ and to r=6=46 mod 8. 6 is written in binary as "110", which is now added to the EBS which now looks: EBS="10 110". And so on, we apply the remover once more to get the new permutation: g,b,c,d,f,e,a, defining ports g, b, c as the p group and ports d, f, e, a as the q-group. Applying the measure of the IVA, to read $\rho=23.1 \rightarrow \rho=23 \rightarrow r=7$ MOD 8, now adding the string "111" to EBS which now looks as: EBS="10 110 111" and on it goes.

At any point one could select another group of p and q, and another remover, RMV and repeat the above procedure, to continue and extract a randomized string EBS out of the IVA.

Double Measurement

The inherent mapping of analog reading to digital results imprints a shadow of doubt on the process, in some borderline situations the reading of two duplicates IVAs may not be exactly the same. To counter this, one could encrypt a secret message using two different keys extracted both from the IVA. If the decrypted message is the same in both cases, then no error occurred.

Environmental Fitting

The IVA is often part of a large system. In some implementation security is paramount, and hence the IVA will be fitted in a secure cupboard or box, perhaps with a glass window, visible to all. If used for cryptographic purposes, the IVA may be used as a container of randomness, and as a replacement for bit-wise files which are hackable. In that case the IVA will be fitted into the computing environment for quick and easy reading.

An elaborate environment may be constructed for financial application. In particular we discuss the concept of the Coin Logger.

The Coin Logger

The IVA technology may be used to mint coins of any denomination, in particular in large denominations. Using implementation where the signature can be exposed, a payer could convince a payee that the physical coin of ID mark M and denominated at value $X is bona fide, by allowing the payee to fit the coin (the IVA) in a "coin logger" which is loaded with the public ledger issued by the mint, specifying full or part signatures of all relevant circulating coins, or alternatively a coin logger which can communicate live with the mint regarding the readings of each coin minted by that mint, and in particular the coin at hand (marked M). The coin logger will read the coin, and these readings will be compared to the signature to ascertain the validity of the coin.

The coin logger may be a simple yes/no device, just reporting the result of the verification test. But in other versions it may be a "workstation".

We describe below a coin logger in an advanced mode. It is a unit comprised of:
1. The coin socket
2. The coin ID reader
3. The coin meta data reader
4. Coin Logger Processor
5. Coin Data Display
6. Coin Data input devices The coin itself will be fitted (attached to) with an electronic part, the Coin Tracker. (the Electronic Data Piece, EDP). The coin tracker will log data relevant to the coin, its history and its disposition, collectively called coin meta data. The coin tracker will be well fitted to the IAV (payload) part of the coin assembly and in fact the IAV part of the coin plus the coin tracker will be regarded as the total coin. The coin tracker will have permanent memory and communication ports. The ports will connect the coin logger to pass information back and forth between the coin logger and the coin handled by it. Each IAV coin will have a visible, hard placed coin identification symbol. This coin ID will be used to compare database signature (indexed by that marked coin ID) to the ID readings of the IVA.

Financial Applications

The fact that the IVA coin is physical endows it with the following attributes: (i) it cannot be double spent, (ii) it can be transacted without real time network connectivity. In that respect it is akin to old-fashioned cash. However, the fact that the IAV coin uses randomization technology whereby the infeasibility of counterfeiting can be adjusted to as a high a value as desired, gives it an edge over old-fashioned cash.

But the IVA coin has advantages not found in old-fashioned coins—it has a unique id which can be ascertained remotely. And that unique ID gives it all the power available to digital coins like in nominal BitMint, mainly full range tethering—controlling its disposition to any set of logical terms. This unique remotely verifiable coin ID also allows for the full detailed history of the coin to be logged on the coin itself. This leads to a robust accounting system where all transactions are logged four times: 1. in the books of the payer, 2. in the books of the payee, 3. in the coin itself (meta data), and 4. in the coin-loggers run by the payees.

The coin logger can record on the coin submitted to it for verification. So the logger first uses its own database of coin signatures published by the mint. Since the coin is physical there is no worry of obsoleteness as is the case with digital coins because if the coin is physically presented and it has the properties indicated by the signature then it must be it. Coin that were redeemed are out of circulation. The coin logger will be loadable with the signature database issued by the mint through a USB stick or other off line means, or it may be WiFi connected and download the signature database from the mint. If the coin is of high value and the payee wants to get more assurances, then the payee will measure a different combination of p and q ports for the recorded resistance and send it to the mint for verification. Or the payee will ask the mint to pick some p ports and q ports to put $V_p$ on all the indicated p ports and to put $V_q$ on all the selected q ports and then measure the resultant current, divide the potential difference to the current to compute the effective resistance under these circumstances, and then send the result (either row analog or modular math integer) to the Mint for verification.

Once the coin is verified, the payee coin logger will write its part to the meta data to record the transfer of the coin from the payer to the payee, identify the time of the transaction, and possibly by GPS the location of the transaction. Alternatively the payer will record a statement to willingly pass the coin to the payee. The payer may then cryptographically sign this statement with his private key and offer the public key for the payee and any subsequent coin holder to use to verify the authenticity of the payer's declaration of transaction. A copy of what is recorded on the coin will be recorded on the respective coin logger. So over time the coin will have a longer and longer trail of meta data indicating its chain of custody, and the coin logger will have a growing list of transactions recorded in it.

For high value coins the protocol might dictate a strict recording of the chain of custody where the payer write that at time certain, and perhaps at location certain it transferred the coin to the payee. This declaration of transfer of the coin is then signed by the payer private key, and the corresponding public key is supplied next to the statement. Or the public key may be found on a public bulletin. Any of the common alternatives to signing with a hash, may be used. In particular the method described in U.S. patent application Ser. No. 16/505,751 "Cyber Companion" where the meta data is written with a unary alphabet, where the identity of the bits is used to mark the signature of the writer.

At any event anyone examining the coin and its meta data will be reassured that the payer (and no other) have declared that he passed this coin to the payee. The payee, once he becomes a payer and passed the coin further, also writes a payment statement identifying who she passed the coin to, the time, the location—and then it is all signed by her signature. Thereby the coin carries along its entire chain of custody and it is clear who owned the coin from when to when, and to whom it passed. The meta data writing protocol may call for every payer to sign not only her own transactional statement but also to sign the entire train of meta data on the coin. This will bring some layered security to the meta data similar to the security offered by blockchain.

Some coins of high denomination might be examined by the mint to insure that the chain of custody is with full integrity otherwise the coin will not be redeemed. This risk then motivates any payee to check for himself or herself that the previous chain of custody is in good order.

IVA coins can be issued as bonds, as credit, as stake in real estate, and stocks. Like any coins with identity and value fused together.

The IVA coin may identify the rightful owner in its metadata, so that in case of loss or theft, the non-owner cannot make use of the coin.

RockCoins: BitMint Chemical Digital Money

Replacing Hackable Explicit Bits with a Hack-Safe Implicit Chemistry

The intrinsic problem with digital money is its bit-expression. Bits—wherever stored—are readily copyable, stealable, hackable. Bit-territory is infested with high power bit-assailants, leaving no bit-expression safe. And when the bits express money they become a very juicy target indeed. Presenting a solution based on de-bitting money. Keeping information off the digital grid. The Rock of Randomness—the "Rock"—keeps randomized information implicitly, captured in its chemical structure. To read this information one needs to have possession and physical access to the 'rock'. Counterfeits are infeasible. Money first emerged as solid metal measured by weight. It developed into flimsy banknotes, and then to counterfeit-prone digital expression. Now we turn a full circle: digital physical coins. The first version thereto is captured in U.S. Pat. No. 9,471,906, and the more robust coin is based on the "rock of randomness" technology, see publication by the Material Research Society. [http://bitmint.com/RR_MRS_H92.pdf]

RockCoins (ρCoin): BitMint Chemical Coins Type II

BitMint chemical coins Type I are described in U.S. Pat. No. 9,471,906. Here we describe Type II. BitMint mint will publish chemical coins type II in some agreed upon denominations, each denomination will be minted in a prescribed amount. The coins are readable, and verifiable—transactable. They are passed from hand to hand, like old fashioned coins. And they are counterfeit resistant.

ρCoin are designed to be used primarily for large denominations, but can be used for any denomination. They come in various sizes for various denominations. BitMint ρCoin can be registered to an owner, can be placed in a physical wallet, a box, a safe. They are easily carried and handled by hand.

ρCoins are minted in some similarity to regular (non materialized) BitMint coins where a 'capsule' (frame) houses a 'payload' (a "rock of randomness"). The ρCoin identification and various parameters data is marked on the capsule. The marked data is written electronically such that when the coin is placed in a coin-reader (ρCoin-Verifier) the reader can read it. Some or all of this data is marked on the capsule for human readability. The heart of the ρCoin is the payload. The BitMint payload is a bit string comprised of some v bits. The identity of the ρCoin is expressed via the exact identities of v bits of the payload. These v bits are captured not in a bit format, but rather in the chemical structure of the physical ρCoin.

A payer presents the ρCoin to the payee. The payee fits the ρCoin in a ρCoin-Reader (ρCoin-Verifier). The ρCoin-Reader reads the marked 'capsule' data and in parallel reads the payload data captured in the chemical structure of the ρCoin.

When the ρCoin is read, the ρCoin-Reader will either send the data to a third unit to complete the verification, or it will compare the reading to a copy of the public ledger that lists all the minted coins (the mintage). Alternatively the ρCoin-Reader (Verifier) will be connected online to the BitMint database, (ledger), and retrieve the bit expression of that coin from that database to compare to the readings from the coin. If the ρCoin data (capsule+payload) is consistent with the ρCoin-Ledger, then the payee trusts that the coin is valid, and that the BitMint mint will pay the nominal value of the ρCoin when the ρCoin is redeemed. The payee will then accept possession of the ρCoin as payment per its nominal value. Each coin per its id will have a different (randomized) string of v bits. The identities of these v bits will affirm the identity and validity of the RockCoin.

Basic ρCoin Life Cycle

A BitMint customer wishes to buy a ρCoin of a given denomination of $X. The customer conveys the nominal amount ($X) to the BitMint mint, and receives in return a ρCoin where the capsule part is marked on the ρCoin in a readable way, and the payload is marked according to the Rock of Randomness technology. The buyer takes the physical ρCoin with him to safe keep.

At some point in the future the buyer wishes to use the ρCoin as payment. He or she will then pass the ρCoin to the designated payee. The payee will fit the ρCoin in the ρCoin-Reader and verify its bona fide status before accepting it as payment. The ρCoin then passes from its payer to its payee.

The new holder (owner) of the ρCoin will readily switch to payer status and pass the coin to the next payee. Such trade will continue indefinitely. Each time the payee validates the status of the coin as payable.

Eventually the ρCoin last holder will return it to BitMint, which will verify it, and either discard it, or put in ready mode to pass to the next customer wishing to buy a ρCoin in the same denomination. BitMint will also honor its commitment and pay the ρCoin redeemer the nominal sum of $X.

In practice: the original buyer of the coin may have to pay a bit more than the nominal value of the coin, and the redeemer might be paid a bit less than the nominal value, in order to build a profit margins for the BitMint operation.

ρCoin Security Advantage

The 3D manufacturing process of the ϱCoin is inherently one-way. Much as it is inherently infeasible to repack an egg from an omelette, so it infeasible to manufacture a ϱCoin that will conform to pre-set measurements. This implies that even the mint (not just the counterfeiter) cannot construct a ϱCoin that would fit into a coin record in the public ledger. The mint is feeding randomized bits to a 3D printer, and as it does so it is clueless as to what measurements to expect. All that the mint can do is to measure the ϱCoin as it comes out, and list it. Once the generating randomized-bits are destroyed, there is no way to reproduce the ϱCoin.

Theoretically a holder of a coin could use a destructive process to study the material construction of the coin, and duplicate it. Alas, this process requires possession of the original coin; it requires it destruction (and hence loss of its value), and thus one will have to construct at least two counterfeit coins to benefit from the fraud. The effort to destroy and duplicate is proportional to (i) the physical size of the coin, and (ii) exponentially related to the resolution of the material assembly. That means that the mint can adjust the physical parameters of the coins relative to their denominated value, to make it unprofitable to attempt a counterfeit.

RockCoin (ρCoin) Assembly: Description and Structure

The ρCoin Assembly is comprised of the ρCoin and the ρCoin-Verifier. The ρCoin Verifier is applied to the ρCoin in order to verify its validity.

The ρCoin is comprised of the ρCoin Prover (the ρCoin-"Rock") and its frame. The ρCoin Prover (the 'rock') is comprised of a unique composite of chemicals that carry coin identity data, not in the usual form of strings of bits, but rather as complex chemical properties of the material assembly of the ρCoin Rock. The technology of the Rock is the one described in the "Rock of Randomness" [http://bitmint.com/RR_MRS_H92.pdf and in patent application Ser. No. 15/898,876], adapted to the purpose at hand. The ρCoin Prover (the "rock") is fitted in a frame designed to make handling convenient, and to serve as a writing board for information related to the ρCoin.

RoCoin Prover (the "Rock")

The following describes a restricted version for constructing the lump (the "rock") where resistance is measured between two specified points only.

The ρCoin Prover is comprised of a solid 3D printed complex assembly ("rock") of materials fitted with p "ports", a "port" being a spot on the surface of the rock onto which an electrical contact can be attached. 2m of these ports are regarded as "money ports" or "published ports", and the balance of 2s ports are regarded as "security ports" or "unpublished ports". We have then: p=2m+2s.

The ρCoin rock is a physical embodiment of money minted by the manufacturing mint. Using the basic BitMint money language, the denominated value of the ρCoin, V, is represented by v bits of unique identities. These v bits are represented through the "rock of randomness" mechanism through readings of resistance values. The reading of the v "money bits" will be carried out by the ρCoin Verifier, when the ρCoin is fitted into it. The ρCoin-Verifier is fitted with p arrayed pins designed to fit into the ρCoin-rock ports. The values of these v money bits is published in the public domain, allowing the ρCoin verifier to ascertain that the tested ρCoin is indeed the properly minted coin.

The 'rock of randomness' method of reading data in the rock (the ρCoin) is also applied over the 2s security ports, only that these readings are not published.

The bit readings over the ports can be done in various ways, one option is described ahead.

RockCoin Symmetric Port Reading

The symmetric ρCoin port reading can be carried out over the money (published) bits and over the security (unpublished) bits. It proceeds as follows:

The reading is carried out over 2n ports arrayed such that n ports are marked on one side of the 'rock' and the other n ports are arrayed on the opposite side of the rock. Each array of n ports is properly ordered 1, 2, ... n.

Reading is carried out by selecting port i (i=1, 2, ... n) from one set of n ports and port j (j=1, 2, ... n) from the opposite array of n ports. Electrical voltage (EV), is being set between these two ports. It results in a current I(i,j) to flow between same ports. This flow allows one to compute the effective resistance between ports i and j, R(i,j). The 'rock of randomness' methodology then maps the R(i,j) reading to a number ρ(i,j) between a value 0 and a maximum reading, $2^h-1: 0 \le \rho \le 2^h-1$. ρ(i,j) is expressed through a bit string of length of h bits. There are $n^2$ possible (i,j) pairs, which amounts to reading $hn^2$ bits by measuring exhaustively all the combinations of (i,j) pairs.

Applied to the money bits (n=m), one could express the string of v bits that represents the money embodied in the tested ρCoin, we have $v \le hn^2$.

The money bits coin reading happens by sequentially stepping forward first the i-count (the count of the port in one array) keeping the j-count fixed (the count of the port in the opposite array), and when all the i values have been used: i=1, 2, 3, ... n, then advancing the j-count by one, and again measuring all i-ports against that j-port. And so on until all the measurements of the $m^2$ pairs are sequentially measured.

The choice of which port to apply the voltage to, is made by the choice of connection "wires". A port that is placed in row u and column v will be activated (voltage applied) by targeting row u and column v as a combined signal to flip the gate on the RockCoin Verifier and activate that port. Other common methods to activate a given point in an array are also usable.

Illustration: Let a certain ρCoin represent $1000. It is written in the basic BitMint way where each cent is expressed via a 5 bits string of particular identity. The total number of money bits, v, will be: v=5*1000*100=500,000. The ρCoin is fitted with 2m=500 money bits ports, in two arrays of 250 ports each. The arrays are organized in a rectangular (matrix) order in 10 rows and 25 columns. These two arrays define 250*250=62,500 pairs to measure ρ values for. The ρ measurements are bounded by: $0 \le \rho \le 255 = 2^8-1$, and hence are listed as h=8 bits per ρ measurement. In total the reading of all 62,500 measurements define a bit string comprised of 62500*8=500,000 bits, which is exactly the number of bits (v) that comprise the identity of that coin.

The ρCoin Verifier will apply electric voltage EV to the $m^2$ pairs of ports in an agreed upon order so that the resultant measured bit string of v bits will conform to the order of the bits as minted. Since the values of these v bits is published for public exposure, the ρCoin-Verifier will be able to measure the tested ρCoin and confirm that its reading is what it should be if the tested ρCoin is what it claims to be. This is the mechanism for the ρCoin verifier to verify the claim of the ρCoin for authenticity.

Measuring the bit strings for the security bits is carried out in a similar way, except that the protocol calls for a dialogue with the mint. The mint specifies the values of i and j for the two opposite arrays of ports. The ρCoin Verifier measures and computes the ρ(i,j) for this pair, and submits the reading to the mint. The mint will signal if the submitted measurement is what is expected, or not. Inconsistency raises a warning for a counterfeit, and for coin rejection. The mint may be asked to challenge the ρCoin Verifier with another pair, (repeatedly), until the ρCoin-Verifier is satisfied that the readings submitted to it, is what is expected of that ρCoin per the respective data in the mint secret database. The mint has performed the same reading of that rock before releasing it. The mint keeps the reading in its private secret database. These readings are not published, and used as an extra measure of security. The higher the value of the coin, the more important this security measure.

It is important to note that the mint does not pre-determine the readings of the port pairs, but does itself perform the same reading on the manufactured rock before releasing it.

RockCoin Frame

The ρCoin Frame serves as a housing for the rock-of-randomness, and as a service unit. On one hand the ρCoin Frame is a holding embrace for the rock, it defines the external dimensions and features of the ρCoin assembly. Handles, or hooks are fitted in the frame. The ρCoin rock, the "prover," may be fitted snugly into the frame, or may be secured to it with a glue or otherwise, as the case may be.

The service provided by the Frame is (i) fixed data board, and (ii) dynamic data board. The fixed data board identifies the mint, the id of the coin (some alphanumeric word), the minting date, and any other fixed parameters including the category of that coin. The dynamic data board allows the ρCoin Verifier to inscribe electronically any data regarding verification events, and custodial transfer. This dynamic data will be read by the subsequent verifier, and by the mint when the coin is eventually redeemed.

The term 'category' refers to administrative designation of a ρCoin. Some ρCoins may be freely transacted, others only in designated circles of traders.

The RoCoin Verifier

The ρCoin Verifier is a capsule that is designed to read the data contained in the ρCoin. It may come in different modes. In the simplest form the verifier will read the bit expression of the coin and either display the result, or communicate the reading result in some electronic way to another unit which will use that data to determine if the ρCoin is bona fide.

A more advanced Verifier will have a copy of the public ledger of minted ρCoins. It will then compare the reading of the coin from the ρCoin-Prover (together with the coin id from the ρCoin-Frame) to the data in the public ledger. If the data agrees, the Verifier will signal (e.g. green light) to its handler that the ρCoin passed the test, and should be regarded as bona fide. It will alert the handler in case the data does not agree.

The ρCoin-Verifier will read the data from the ports in the right sequence to compare to the data in the public ledger.

A more advanced ρCoin Verifier will have a copy of the public ledger of minted ρCoin but will also have Internet connection to the BitMint server, to check if there is anything new to learn about the claimed coin. For example, if one constructed a counterfeit coin, copied the right coin id, but was not able to build the rock of randomness to provide the right reading, then a Verifier will flag it out, deny the coin, and eventually report to the mint that someone is trying to pass a counterfeit coin of that ID. That information will be available live to the public. It will be seen by a Verifier with online connection.

The Verifier will be able to add security to its determination, by using its online connection to the BitMint mint. It will ask the BitMint mint to challenge it with a reading of a random pair (i,j) among the secret ports. The readings of p values among the secret ports is not published. (Remember that reading of the money ports is made public). The BitMint mint will select a random pair (i,j) of two ports from the secret ports. The Verifier will read the ρ value of these ports ρ(i,j) and report the reading to the BitMint mint. The mint will return an OK signal if the reading is consistent with the secret database handled by the BitMint mint, and alert the Verifier if the reading does not agree. In the latter case the Verifier will signal 'rejected' for the ρCoin verification test, and in the former case, it will either be satisfied and conclude the test in a positive conclusion, or according the Verifier policy it will ask the BitMint mint to pick up another random pair (i',j') and go through another round of comparing rock reading with the secret database. The Verifier will run as many rounds as desired (normally the higher the denomination of the ρCoin the more tests are warranted).

In one particular embodiment the ρCoin-Verifier encloses the ρCoin with a bottom part and a top part. Each of these parts is arrayed with "pinned" electronic connectors designed to fit into the ports marked on the ρCoin-rock. The pins are set such that an external electronic circuitry can at any interval of time Δt apply the voltage EV to a column line and a row-line in the pin array. This creates a situation that over that specific time interval Δt only a particular pin that is in the cross point of the designated column and designated row is connected to an electric voltage. Over the next Δt interval the electronic circuitry of the ρCoin-Verifier will apply the voltage (EV) to the next port in the sequence (in the bottom part or in the top part. This will happen by shifting the row or the column line in the array where the current is applied). Over the next time interval Δt another shift will occur, and so on. Over each such time interval (Δt) the ρCoin-circuitry reads the current, I, between the two designated ports as a result of applying the voltage difference between these ports (EV), and then the electronic circuitry computes the resistance R=EV/I, and from R, computes the bit string ρ. Each Δt another string containing the value of the ρ between these two ports (and of fixed length of h bits) is added to the accumulation list of these readings, so the full bit-list of the coin is built, (v bits in total) and then compared to the identity of the coin of the same Id, as recorded in the BitMint database. Only if the fit is perfect is the coin regarded as bona fide.

Illustration: Consider a particular coin with id: P500. Let the money-port for that coin be set in two parts: 3 ports (x,y,z) on one side of the rock, and 2 ports (a,b) on the opposite side of the rock. Note: the nominal description calls for 2m money ports, m ports on one side, and m ports on the other. But this division is for convenience, it is not essential. In our illustration herein we show a non even division of ports. We use for illustration an h value of h=3. Namely the reading of resistance between the i=1, 2, 3 and the j=1, 2 ports R(i,j) will be translated using modular arithmetic (as described in the Rock of Randomness patent application U.S. Ser. No. 15/898,876, for which this application is a continuation) to a range of $\rho(i,j)$: $0 \le \rho(i,j) \le 2^3-1=7$. The Verifier will measure the R values by order: [a,x], [a,y], [a,z] to represent the resistance measurements between points a-x, a-y, a-z respectively. Ans then respectively [b,x], [b,y], [b,z]. The Verifier will then compute the respective $\rho$ values. [a,x]=2, [a,y]=4, [a,z]=5, [b,x]=0, [b,y]=6, [b,z]=1, and construct money string v=010 100 101 000 110 001. The Verifier will then compare the measurements with the public ledger that says:

Coin P500: Money String: 010 100 101 000 110 001

The ledger and the measurements are consistent and so the coin is authenticated.

RoCoin Operation

We describe:
ρCoin minting
ρCoin payment and handling
ρCoin redemption
ρCoin accounting RoCoin Minting The BitMint mint will operate under a given plan to mint a certain number of coins of certain denomination, and a different number of a different denomination. For each coin the BitMint mint will decide how many bits will be needed to express the coin, according to the BitMint money language. Based on this number, v, and the known parameters of the rock of randomness, the BitMint mint will determine the number, h, of bits to be interpreted from the row reading of resistance between two money ports on the coin. The ratio v/h will determine the number of pairs of ports (i,j), that will be needed to fit between the reading of the coin, to its coin identity string (comprised of v bits). Accordingly the Bit-Mint will have to fit the ρCoin with two arrays of m money ports, such that $m^2 \ge v/h$.

Based on these calculations the BitMint mint will use the 3D printing specified in the Rock of Randomness technology protocol (see U.S. patent application Ser. No. 15/898, 876) to mint a rock and fit it with 2m ports. When the rock is minted (3D printed) and the ports fitted, the BitMint mint will read the resistance values R(i,j)=EV/I by dividing the applied voltage, EV by the resultant current I, and interpret that R value as a $\rho(i,j)$, a number in the range of 0 to $2^h-1$. Reading from each pair of ports will add h bits to the accumulating string that represents the bit identity of the minted coin, according to the basic BitMint money language. That coin identifying bit string will be kept in a database that holds all the outstanding minted coins. Each ρCoin will be given a unique id identifier, Id, and in summary, the BitMint mint will add a coin entry to its minted coin database which will list the coin Id and the ordered readings of ρ values, stretching into a bit string comprised of $v=hm^2$ bits.

The aggregation of all the minted coins will amount to the ρCoin-database. That database will be made public, and be published in a public ledger so any prospective payee of such coins will be able to secure a fresh copy of the minted ρCoin database in order to execute a verification of a ρCoin brought forth as payment.

For high denominations, a ρCoin will have the option of being further secured through additional sets of ports. These will be security ports (not money ports as before). There will be 2s security ports, set in two arrays of s ports each. They will be interpreted with the same h value and amount to $s^2$ pairs, where each pair is associated with a measured ρ number in the range of $0 \le \rho \le 2^h-1$. These readings will be kept in a separate security database. These readings will not be published. They will be used as extra security measures to prevent counterfeiting.

Once the money ports and the security ports have been properly measured and entered into the respective databases, the 3D printed coin will be fitted into its ρCoin-Frame. The Frame will house the 3D-printed ρCoin-Rock, and in addition serve as data boards. The mint will select a unique id for the ρCoin and mark it on the frame. It will also indicate date of minting and assorted pieces of information for various purposes.

So fitted the ρCoin is then stored in a BitMint vault, ready to be shipped out to any trader wishing to trade with it. Normally a trader will provide the denominated value of the coin to BitMint, and claim the coin in return (some process fees are expected).

ρCoin Payment and Handling

The minted ρCoin coin is passed along to its purchaser or to a person to whom it is being endowed. We call them both as the "purchaser". In the normal mode there is no registration of the ρCoin to its owner, it is simply the fact of possession that confers the assumption of ownership, like it is with regular cash. The owner is supposed to take care of the ρCoin and hold on to it safely. He is likely to secure a ρCoin-wallet, a location, or a box where to keep this and any other coins so purchased.

The ρCoin-wallet may be secured in a safe, or hidden somewhere. At any time the holder of the ρCoin may decide to pass it along as payment. Unlike a regular BitMint coin which can readily be split to any desired resolution, the ρCoin has to be paid as a whole, for its entire denomination.

The ρCoin is physically handled from payer to payee, like with regular cash. The payee may express trust in the payer, simply accept the ρCoin on visible inspection, and credit the payer for the denominated amount.

Otherwise, the payee will verify the validity of the ρCoin by applying to it a ρCoin-Verifier. This is a device to which the ρCoin is placed. The ρCoin-Verifier measures the readings of the coin through its ports, and then verifies its claim to be the coin that it claims it is by checking the port reading with the published data in the public ledger issued by the mint. If the measurements check out with the database, the payee is convinced that the prospective ρCoin submitted as payment is bona fide. Otherwise, it rejects it as payment.

For high denomination ρCoins the ρCoin-Verifier will add the security check by inviting the mint to select a random pair (i,j) of ports in the security section of the ρCoin. If the security check is successful, the coin is accepted by the payee with high confidence.

This process will repeat itself when the current payee becomes a payer and passes the ρCoin along.

ρCoin Redemption

Redemption of ρCoin is not much different than regular passing and payment. The BitMint mint will acknowledge the ρCoin and credit its payer, using the above mentioned ρCoin-Verifier. The redeemed coin can be returned back to circulation or it may be destroyed. The BitMint mint decides how many coins to leave in circulation at which denominations etc.

ρCoin coins may be like cash, of indefinite time validity, or they may come with an expiration date. When the date arrives the coin is no longer acceptable as payment and must be redeemed.

If the coin is not timely redeemed, then per policy, its redemption may be denied, or it may be discounted per time of redemption relative to the coin expiration date.

ρCoin Accounting

The ρCoin may be transacted in complete anonymity between its original purchaser and its final redeemer, just like cash. Unlike cash, ρCoins may be minted with a marked expiration date. After that date the ρCoin will have to be redeemed at the mint. Late redemption (beyond the expiration date) may, per policy, take place against a reduced redemption value. So a $10,000 ρCoin brought for redemption on its last redemption date will fetch the denominated value of $10,000 to its redeemer. But if submitted for redemption a month later will fetch only $9,750, and a year later will fetch $7500—as shall be clearly specified in the mint policy.

Alternatively the coin may be set as a monitored category where the ρCoin-Frame will have memory to write into it the full transactional history of the coin. That ρCoin will be redeemed only if the transactional history is in good order.

RoCoin Security

Unlike a regular BitMint coin, the ρCoin is published. It's identity is public knowledge. Its security though is based on the infeasibility of counterfeit, the infeasibility of cheating the BitMint mint by claiming a fake possession.

The inherent security of the ρCoin is the rock-of-randomness technology. The readings of the R (resistance) values between various ports is robustly random. The 3D printing of the ρCoin is a one-way function. That is one prints a ρCoin based on random input to generate a structure with reading values that cannot be pre-calculated but need to be practically measured. It is infeasible for a fraudster to use the published values of the ρ values and construct a ρCoin-look-alike that has the proper readings through all the ports.

For high denomination coins the security ports will be used to stop fraud. The security readings of various pairs of security ports are not published, so a counterfeiter cannot prepare his counterfeit coin to read the expected values. The design calls for sufficient number of security ports that over the expected life span of the coin (the number of times it changes hands) there will always be new security ports that have not been used in the past. So whenever a verifier will ask the mint to select a pair of security ports to be read, the pair will be new, never selected before for that coin. The fraudster will not be able to prepare a counterfeit coin with the proper readings, which is unknown to him.

The best strategy for a fraudster will be to manufacture a ρCoin, measure it, and then compromise the BitMint database and replace an existing ρCoin data with the fraudulent data. This can be defended against by using write-once technology, since there is never a need to change the reading of any minted coin, as to its identity. In addition off-line copies can be made, hash technology used (even in a layered way, like in blockchain) to render this pathway infeasible.

Duplicate Rock Security

The security of the ρCoin is hinged on its irreproducibility. Once the random sequence used to generate a ρCoin is destroyed, there is no way to duplicate the coin, and hence its security. Normally the mint will take electro-chemical measurements of the coin with which to validate any claim of possession of same coin. An alternative strategy would be to use the same random sequence that generated the original coin to generate a duplicate thereof. The duplicate will be kept with the mint. Then instead of keeping a database of each coin measurements, the mint will keep a "warehouse" of the actual coin duplicates. When someone attempts to pay with the distributed coin, then the ρCoin-Verifier will measure the submitted coin, then will connect with the mint. The mint will then measure the duplicate over the same set of ports, and if the measurements agree then the payment if validated.

This "duplicate rock strategy" has several advantages. (1) there is no bit-database to be compromised. The validation data is kept in the same format as the data of the transacted ρCoin, off the bit-grid. (2) there is no need to check and compare the entire sequence of bits that defines the ρCoin. A much smaller number will give sufficient assurance. The disadvantage here is that validation requires online connection with the mint. The mint could then limit the 'duplicate rock strategy' to some ρCoins and not to others.

GPS Tracking

A ρCoin may be equipped with GPS capabilities. Either in a passive mode where its location can be tracked, or in an active mode where it checks and communicates its own location. The GPS may be fit as part of the ρCoin-Frame, and be used in various tracking and security protocols.

Applications

In all applications there is a mint that mints the ρCoins, and issues a live public ledger that lists the bit identities of all the ρCoins in circulation. There is a trading pubic that exchanges the ρCoins as payment. The traders are also equipped with a ρCoin-Reader (ρCoin-Verifier) that can be readily applied to any ρCoin-rock submitted as payment, and issue a determination of bona-fide.

Verification Levels: ρCoin of small denominations may be validated on sight alone, no need for testing the coin with a ρCoin-Verifier. That is because the cost of counterfeiting a low value coin will be prohibitive and unprofitable for the counterfeiter. Also, since any coin of any denomination can be tested in the ρCoin-Verifier, counterfeiters will be concerned about random check that will land them in jail.

The next level of verification will be via a ρCoin-Verifier loaded with a recent copy of the public ledger of the circulating coins. The level above it, will require online connection of the ρCoin-Verifier with the BitMint mint.

The highest level of verification will include a random challenge of the BitMint mint over the security ports.

The choice of verification level will allow one to mint high denomination coins, in contrast to the low limit of banknotes. That is because counterfeiting will be infeasible and the mint maintains total control of the mintage. At any point the mint, suspecting any foul play, can mark any circulating coin as invalid for transaction, and the coin is dead. That is of course not possible with old fashion cash.

There can be several categories of ρCoins. Some for open trade, and some for some restricted trade.

Derived BitMint Minting

A given ρCoin may be put for sale in parts. Especially if it represents an investment commodity, like stock or real estate construction. For example. A contractor wishes to raise money to build a residential complex with 50 apartments. He orders 50 ρCoins and formally says that each of these 50 ρCoins will be redeemed against the total sums paid by the future purchaser of the apartment, once built. The builder can now offer for sale some portion of any of these ρCoins. Each portion will be sold according to what the market will bear. Early purchasers might pay less for the same percentage and late buyers pay more. When the apartment is ready the ρCoin is exchanged against the sum paid for it. But since the ρCoin was parceled out bit-wise (the BitMint way) to several claimants (owners) the apartment money will be divided to the claimants.

Illustration: A builder requests a mint to mint ρCoin formally defined as worth the entire future sum to be paid for a well specified apartment in a building complex. The ρCoin is defined via v=10,000 bits. The identities of the 10,000 bits is published by the mint. The mint gives the builder the ρCoin. The builder then offers portions of the ρCoin for sale. The first buyer pays $25,000 for ownership of 5% of the future apartment. The builder executes a formal transfer, or claim papers that give this first buyer a claim of the first 500 bits of the 10,000 bits of the ρCoin. The identities of these 500 bits is in the public domain. Later a second buyer pays $60,000 for a 10% share of the future apartment. This buyer receives a formal claim for the next 1000 bits of the ρCoin. The builder raised $85,000 for building the apartment. The apartment is eventually sold for a price or $800,000. The claim checks are executed. The first buyer receives 5% ($40,000) at a profit of $15,000 and the second buyer receives 10% of the sale sum ($80,000), at a profit of $20,000. The builder pockets the balance $680,000.

We describe the following application categories:
Private Minting of Fiat Currency and Other Transactable Commodities
   Central Bank Minting of Fiat Currency
   Physical Identities Applications
Private Minting of Fiat Currency and Other Transactable Commodities A private enterprise could mint ρCoin representing value of some amount of the prevailing fiat currency, or value of shares and equity in some transactable entity: stock, bond, real-estate, etc. The resultant ρCoins would be transacted in the designated public exploiting the cash-properties of the ρCoins.

Central Bank Minting of Fiat Currency

The ρCoin technology may serve a central bank to mint its fiat currency in any desired denominations. The security of the technology will be its salient point on which transparency and accountability may be built.

By minting more and more of its money in ρCoin format, the central bank achieves greater transparency together with increased security. The at-will security level of the ρCoin makes it a very desirable format for very large sums of money, traded between banks and traded internationally. The security is in at-will mode because the mint decides how many bits will be used to identify a given ρCoin.

Central banks may resort to ρCoin technology as a primary vehicle to introduce capital to society. They could mint extremely large coins, millions even billions of dollars in value. The physicality and transparency of such coins will create a sense of assurance. Large denomination coins will be naturally tracked, registered and beyond any feasible possibility of any foul play or shell game.

Very large denominations of central bank issued ρCoins may serve as a 'rock of credit' to organizations, even countries that will be able to mint BitMint digital money off that 'loan' or 'endowment' or any other accounting classification attributed to such very large coin. In the past rich countries would 'loan' chunks of gold to prime up emerging economies. In modern time the gold will be replaced with a ρCoin.

The physical nature of the ρCoin makes it the trade of choice in times of emergency, when the Internet is down, when the grid is in jeopardy. All online payment methods will be shut down, but ρCoins will be traded as usual because the ρCoin-Verifiers will have a recent copy of the image of the mintage (the public ledger).

One should not overlook the profound psychological advantage in minting large sums of money in a tangible form.

Physical Identities Applications

The ρCoin offers a robust identification of its identity. This attribute can be used by securing a 'rock' onto an object which needs to be uniquely identified. The identity of the object would be verified through the identity of the 'rock' and the secure way in which the rock is fitted into the object it identifies.

In particular a rock can be embedded into a larger object such that removal of the rock will necessitate a breach of the targeted object. The ports of the rock will have to be accessible from the outside so that its identity can be verified through normal measurements of resistance between randomly selected ports.

One particular application involves the hybrid coin concept for digital physical money, as described in U.S. Pat. No. 9,471,906. The electronic device with the bit money inside may be secured in a shell which is in effect a rock of randomness with an id, and public known resistance parameters data. A payee of such a coin will be able to verify the bona fide status of the coin by measuring the shell (the 'rock') and verify the reading. If the shell had been replaced with a counterfeit, it would not produce the proper reading. This is a way to merge the two types of digital physical coin. Security ports may be added too, if so desired (if there is a great sum of money inside the shell).

Note: the hybrid coin owner can at will crack the shell and use the electronically written money inside in a cyber mode.

Comparing the ρCoin to a Regular BitMint Coin

A regular BitMint coin is designed to be autonomously split by its holder. The ρCoin cannot be split. Alas, one can connect, string together several independent ρCoins to a string-ρCoin, and separate each constituent coin for separate payment. For example, a string-ρCoin will be comprised of 100 $10 ρCoins. A total sum of $1000 than be can be paid to different payees and different times at a resolution of $10.

REFERENCE

The term BitMint relates to BitMint money by BitMint, LLC (bitmintcash.com) which is based on the technology described in U.S. Pat. No. 8,229,859.

Hybrid Coins are described in U.S. Pat. No. 9,471,906

"Rock of Randomness" is described in US patent application No.:

| 15/898,876 | Application Date: | 19 Feb. 2018 |
| --- | --- | --- |

The figure depicts the IVA constructor, which is fed by (i) random data, RAND, and by (ii) a construction protocol that guides the IVA constructor how to incorporate the random data pumped into it, and generate a lump of matter, an identity-verifiable article (IVA), where the internal construction of which, is reflective of the random input data. The constructor may be used with the same input a controlled number of times, after which the random input data may be erased, making any further duplication of the IVA infeasible.

Figure 1:
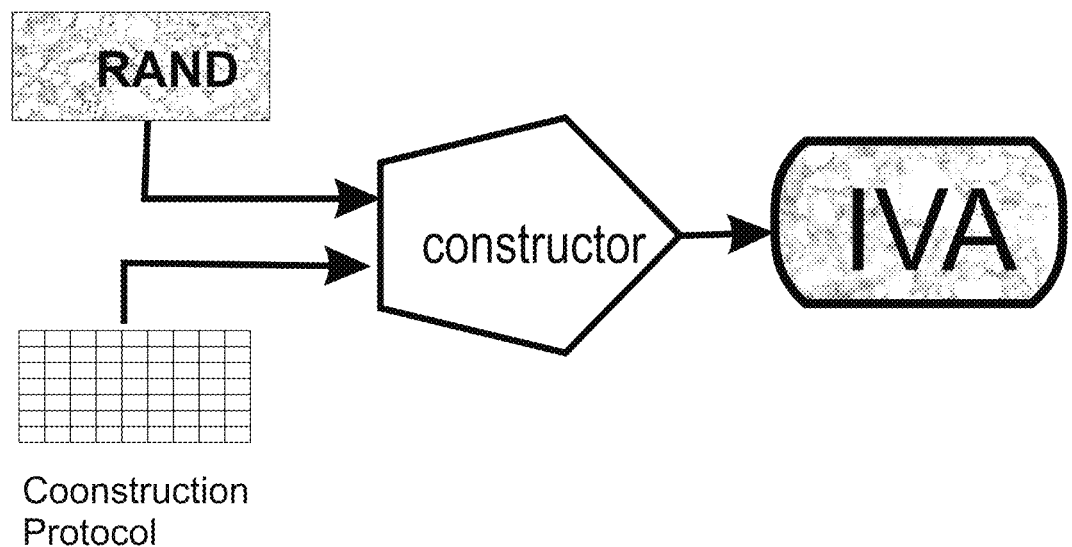
FIG. 1: IVA Manufacturing Scheme
Figure 2:
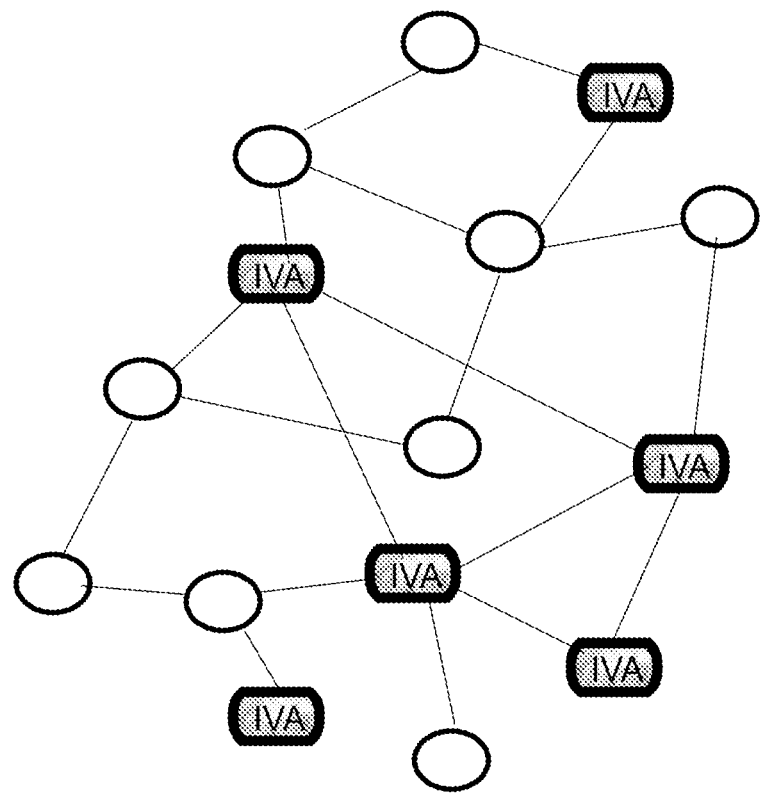

FIG. 2: A sub network of IVA sharing stations

Nodes in a network may share exact duplicates of IVAs, which they may use via a mutual authentication protocol, or as a source of cryptographic keys for secure communication. In the figure nodes that don't share the IVA are marked with an oval. The communication between the IVA sharing nodes may be direct, or indirect.

Figure 3:
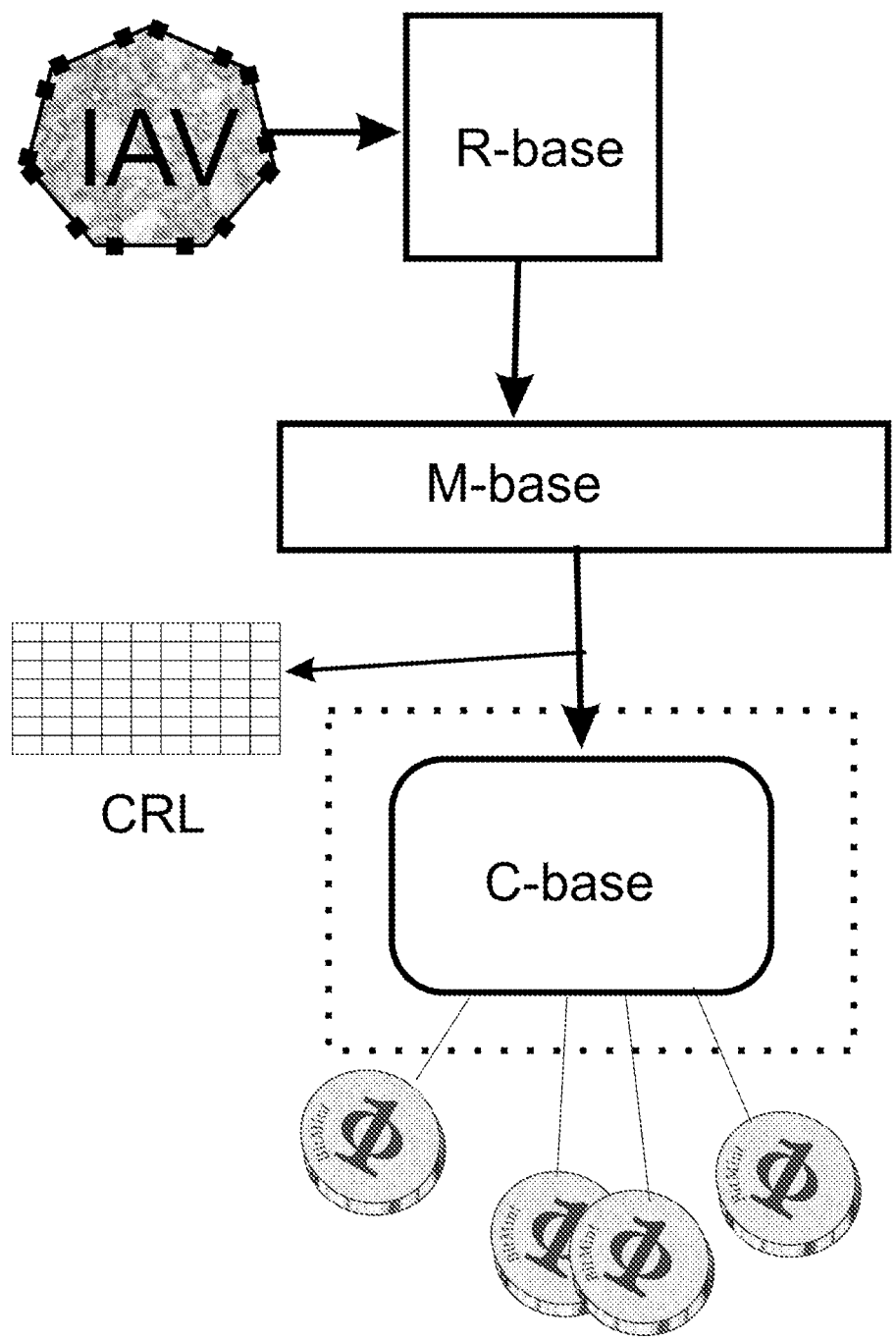

FIG. 3 MIV Supported BitMint Mint

This figure depicts the way the randomness captured in the IAV is first extracted to an randomness base (R-base) where it is expressed in a specified order in a bit-wise format. The R-base is simply an ordered copy of whole or part of the IAV randomness in a computer readable format. The randomness in the R-base is then extracted to a sequence of these random bits. The count of the bits in sequence is recorded. The bits in the extracted sequence form the Mint base—M-base. The M-base serves to responds to request for series of randomness bits issued by the mint. The mint responds to requirements to mint new coins. These new coins require random bits to be formed. The mint then queries the M-base to be given a specified number of bits, n. The n bits are taken from sequence in the M-base. The request including the coin id for which the bits are supplied and the position (count) of the first and last bit in the sequence supplied by the M-base for the same coin are all recorded in the CRL—the Coin Request Ledger.

This arrangement IAV→R-base→M-Base→C-base, is then used to check the integrity of the coin base, which is the base that keeps track of all the outstanding and redeemed coins in the system.

The BitMint mint is shown in a dotted line. It houses the coin-base, an ordered list of all the minted coins. The minted coins are shown a issued coins at the bottom of the figure.

Figure 4:
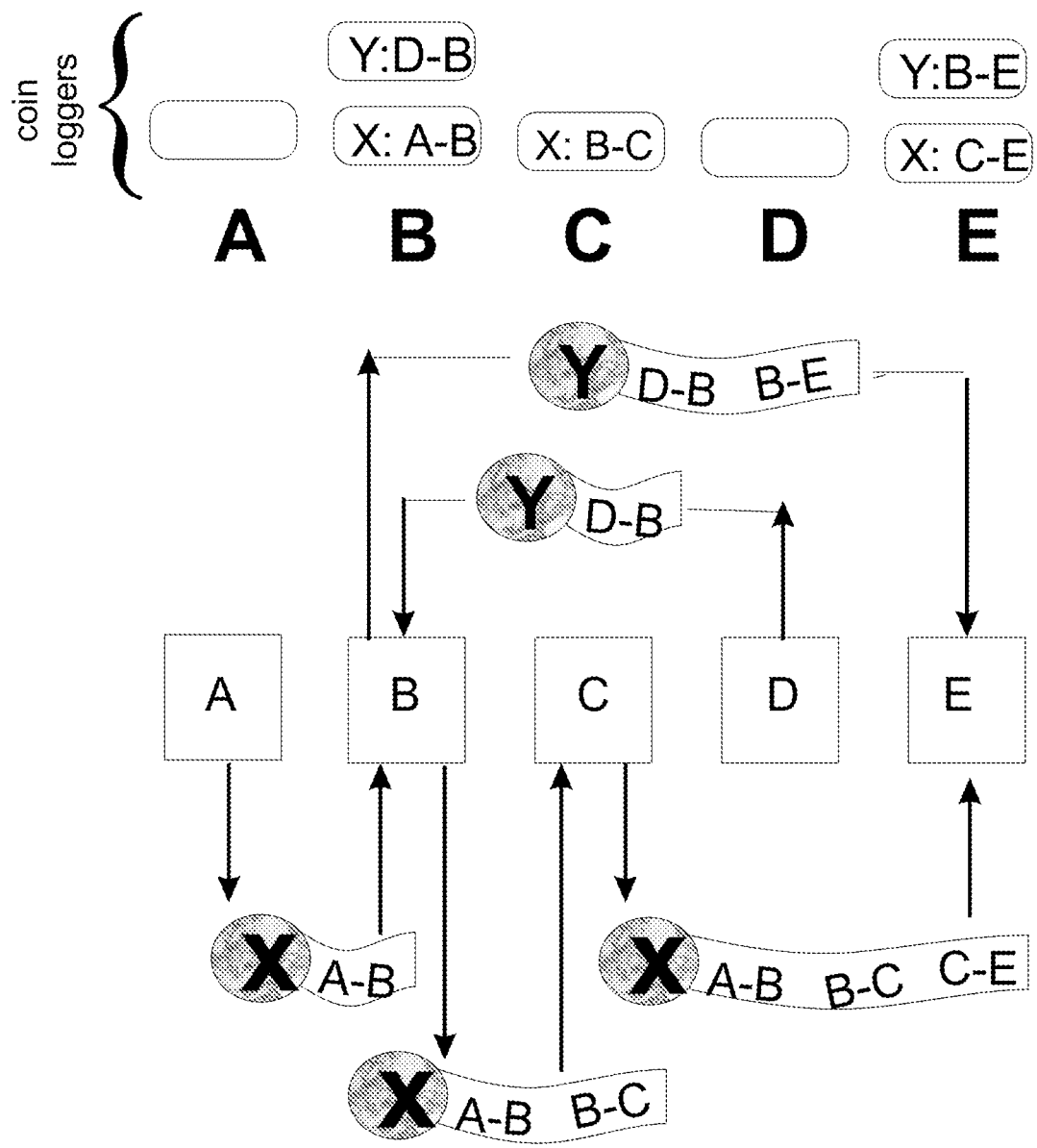

FIG. 4: Quadruple IVA Chain Accounting

This figure shows how transactions of two IVA coins marked X and Y are recorded four ways. The figures shows that coin X is passed from trader A to trader B. Trader A writes into the meta data of coin X the statement of the transaction: identifying passing X to trader B. The figure shows that the coin as it passed from A to B is marked with the transactional statement A→B. In parallel we see at the top of the picture that the coin logger operated by trader B keeps a record of the same transaction. The figure does not show that the logger of trader A marked anything, but the protocol the traders use may require it. It is important for trader B to keep a record of the transaction A→B of coin X because coin X may be transferred further but the coin-logger remains in the possession of trader B. The figure shows that trader B then sends the coin X to trader C, after writing on its meta data that it passes the coin to trader C—this statement is then signed by trader B. The writing on the coin X, in the possession of trader B can be done through the coin logger or through other devices. Coin X now carries its history: A→B→C. When trader C passes coin X to trader E, the meta data on X is growing to A→B→C→E. The figure shows how the loggers of C and E log their respective transactions. The figure also shows that trader D passed coin Y to trader B, and B then passes coin Y to trader E. These transactions are recorded in the books of the five traders—twice, once as expenses and once as income. The transactions are recorded in the coins themselves and the transactions are recorded in the respective coin loggers.

Figure 5:
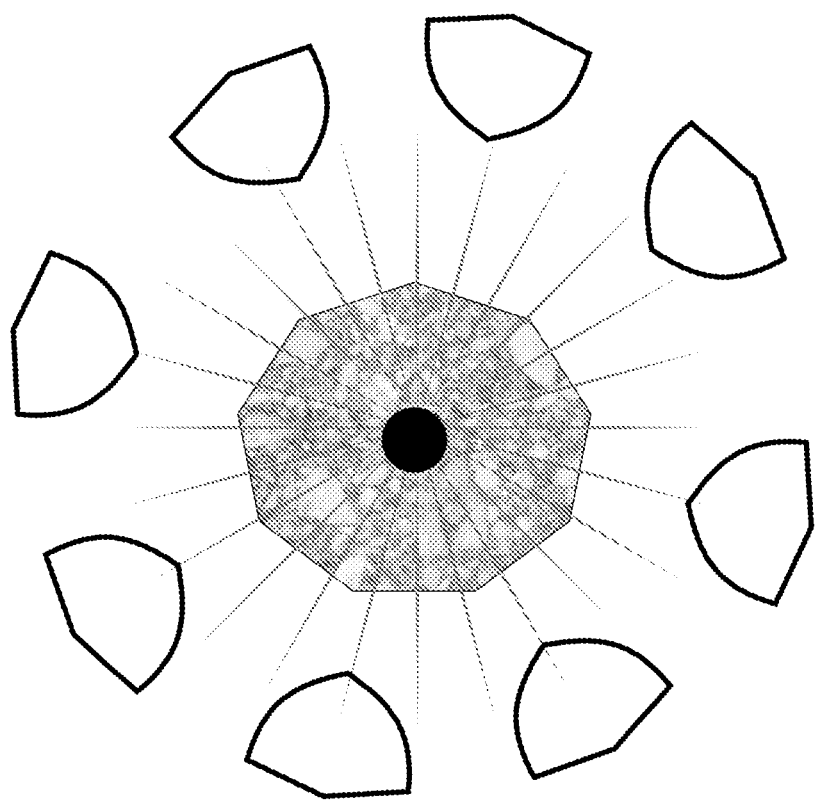

FIG. 5: Built in Central Radiation Source

The figures shows an IVA fitted with a radiation source in its center. It projects radiation to detectors positioned in particular geometry around the IVA and recording each their readings.

Figure 6:
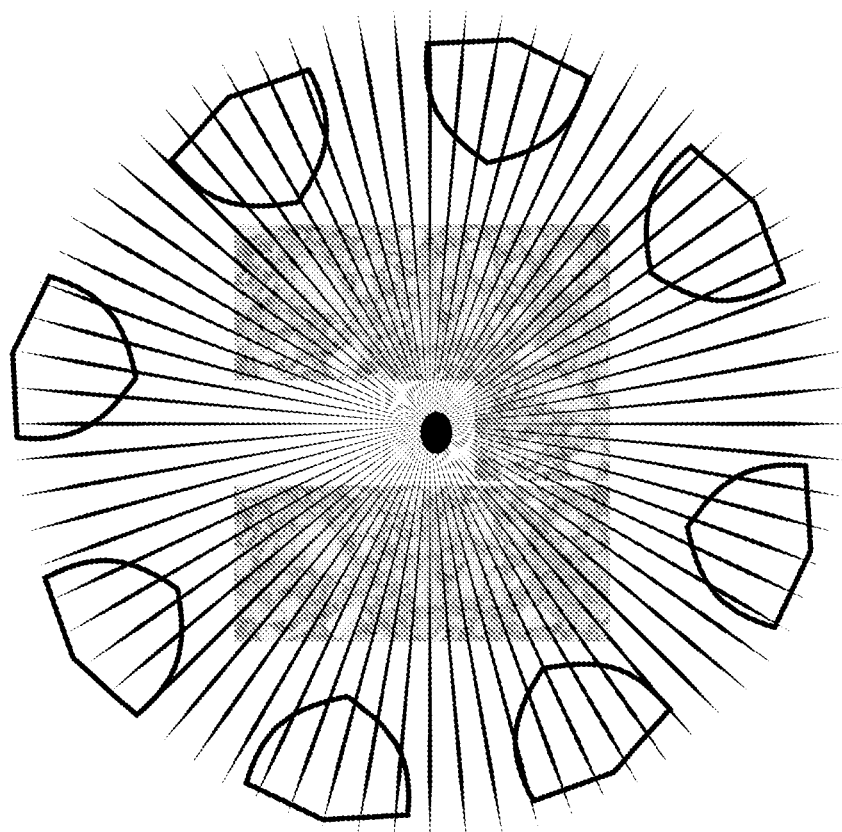

FIG. 6 Applying an External Radiation Source

The figure shows an IVA with a place to fit an external radiation source. It projects its radiation through the IVA and well-positioned detectors outside the IVA take their readings.

Figure 7:
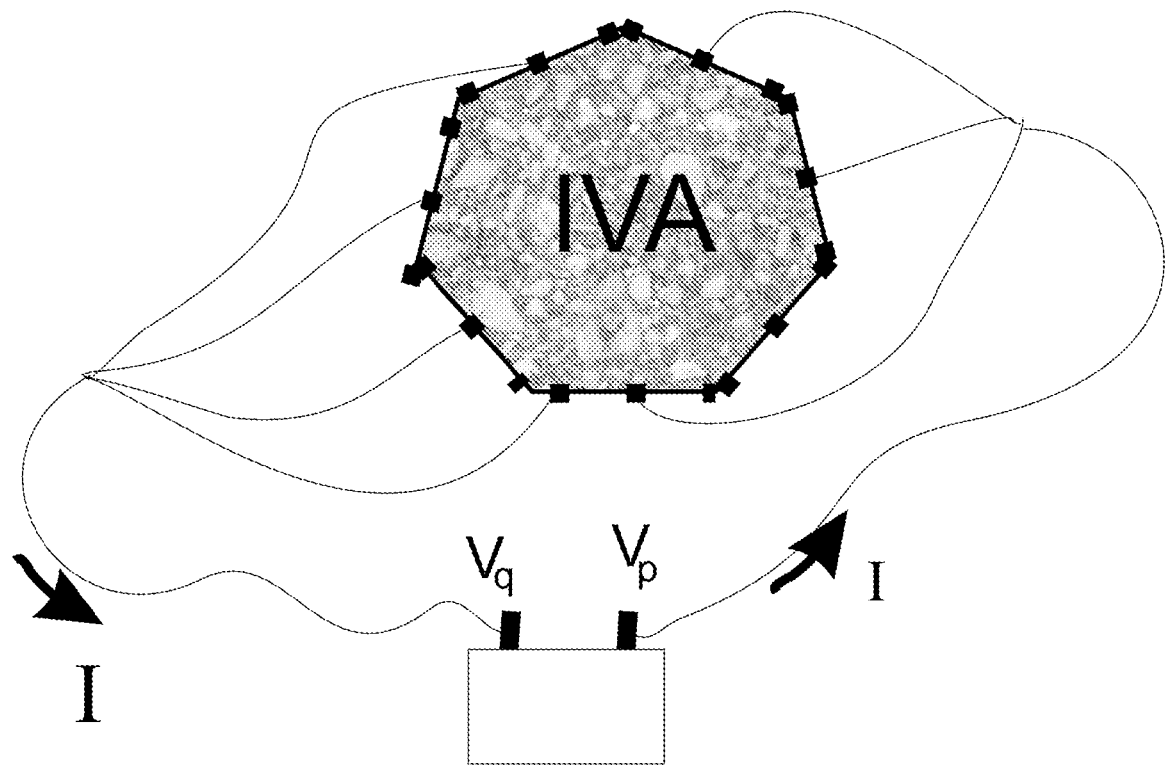
Figure 8:
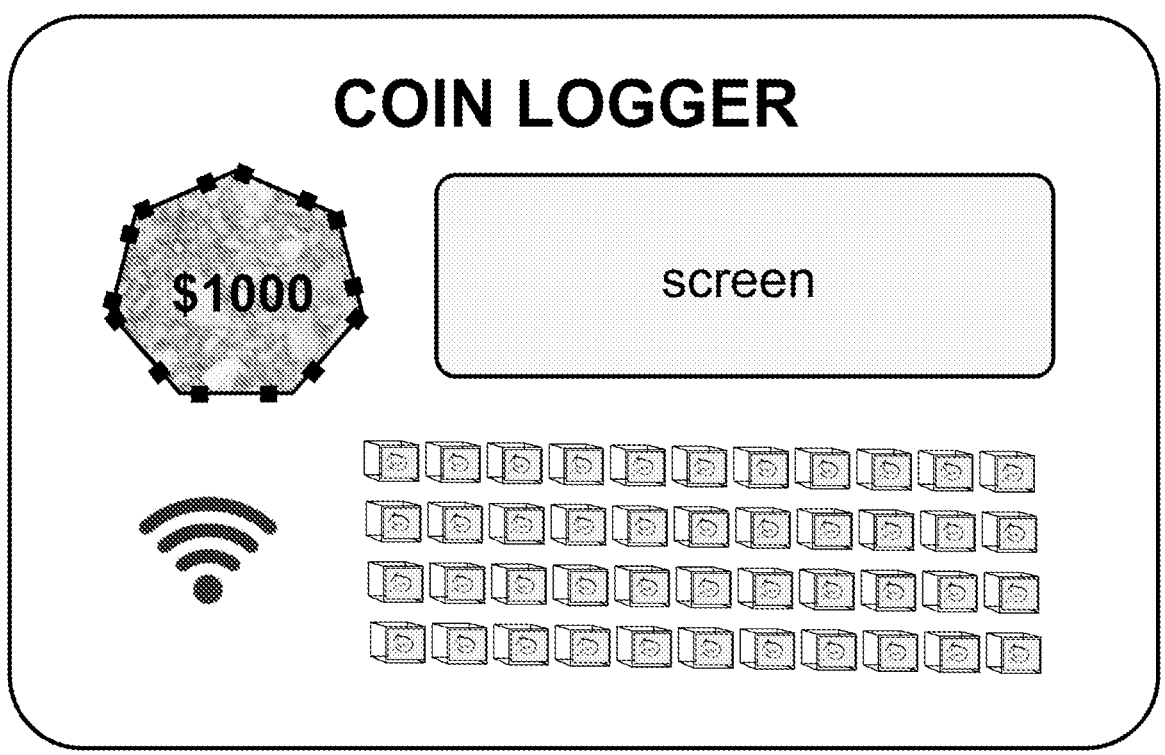

FIG. 7 Multi Point Resistance

This figure shows an IVA with many ports. a particular group of p ports is selected to be applied a potential value of $V_p$, and a different group of q ports is selected to be fitted with a voltage, potential rating of $V_q$. The voltage difference $\Delta V = V_p - V_q$ generates a current I that reflects the randomized resistance of the IVA which in turn is reflective of the randomized input that generated the IVA.

FIG. 8 Coin Logger

This figure shows the face of a coin logger. It show on the right left side of the face of the coin logger box an IVA coin fitted into the socket prepared for it. The coin is being read and verified in this socket, and its meta data is written in that socket. The coin logger face shows a screen to display information regarding the history of the coin and anything else written in the coin meta data. The meta data may contain some tethering information dictating the terms of the coin redemption. The figure also shows a keyboard for the payee to input data to the coin. The figure does not show an optional port for USB or any other physical connector to input meta data to the coin other than through the keyboard. There is also an optional WiFi as shown in the figure.

Figure 9:
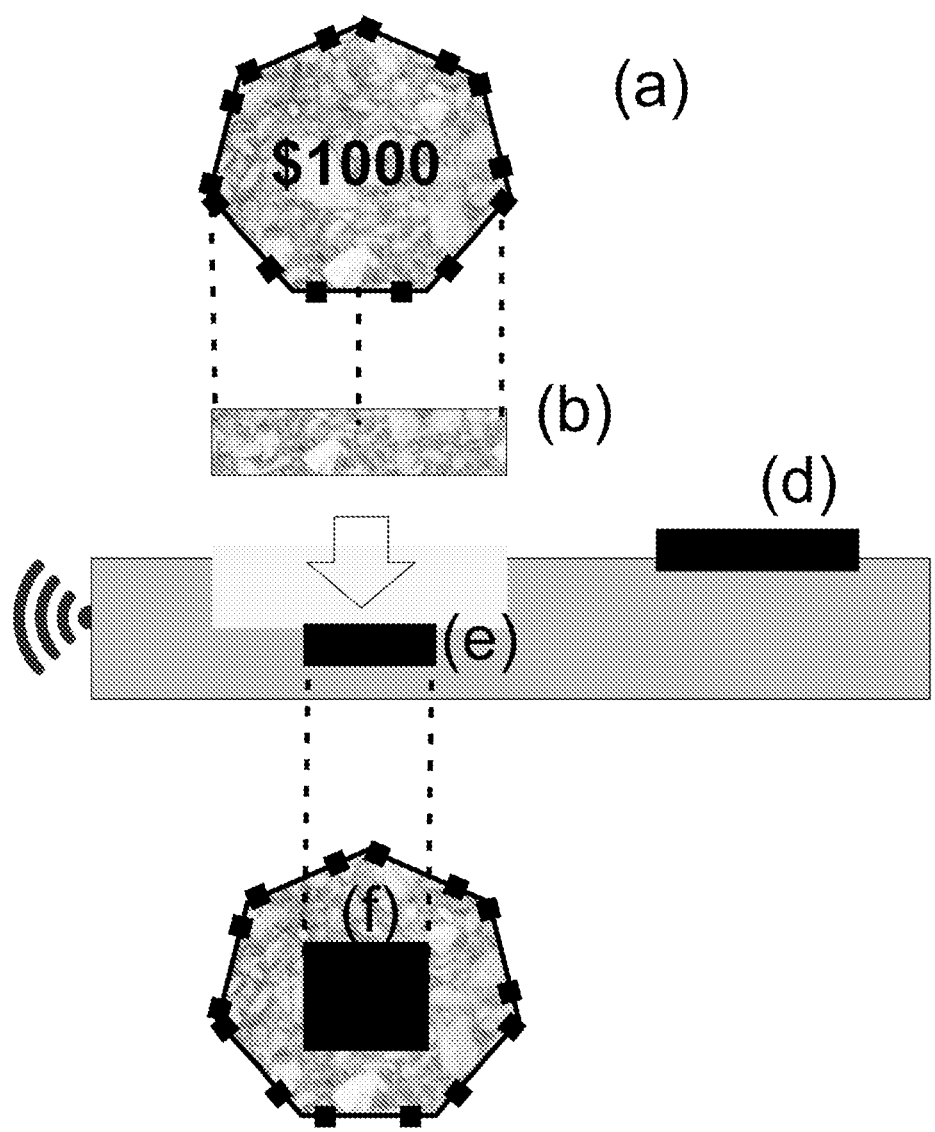

FIG. 9: coin logger side view

This figure show the coin logger from the side. It depicts the socket where the coin (a) is fitted. The coin is also shown form the side as (b). The bottom of the coin has the electronic meta data add-on part (the coin tracker), indicated as part (f) on the bottom depiction of the coin. The coin tracker fits on the connector part in the coin logger, (e). The keyboard is shown as strip (d).

Figure 10:
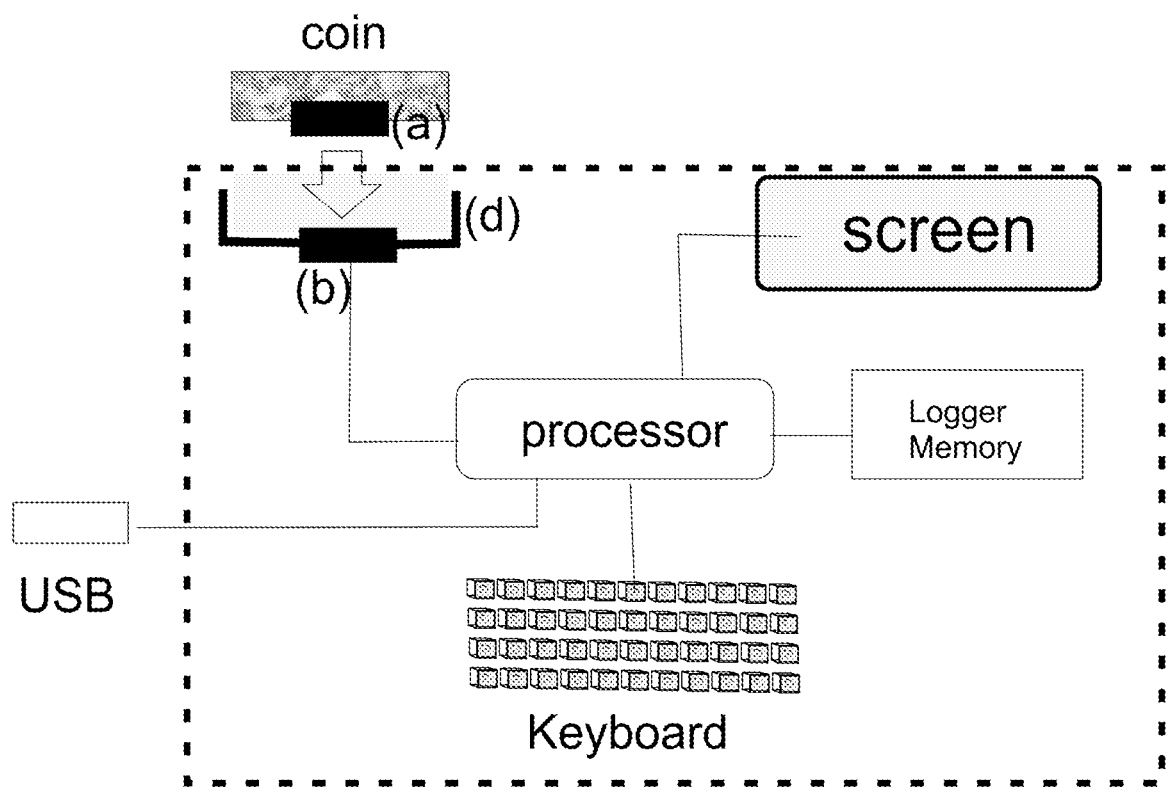

FIG. 10 Coin Logger Anatomy

This figure shows the internal functional parts of the coin logger. On the left top one sees the coin with its coin tracker part (a) how they fit into the socket in the coin logger (d) which is fitted with the readers that read the ID properties of the coin to compare with signature data for the coin. The socket also contains the electronic board that connects with the coin tracker and communicates with the coin (b). All the data from the ID readings and the meta data reading is fed to the processor in the heart of the coin logger. The processor is shown connected to a USB port and to a keyboard, as well as to the coin logger memory location and to the coin logger screen.

Figure 11:
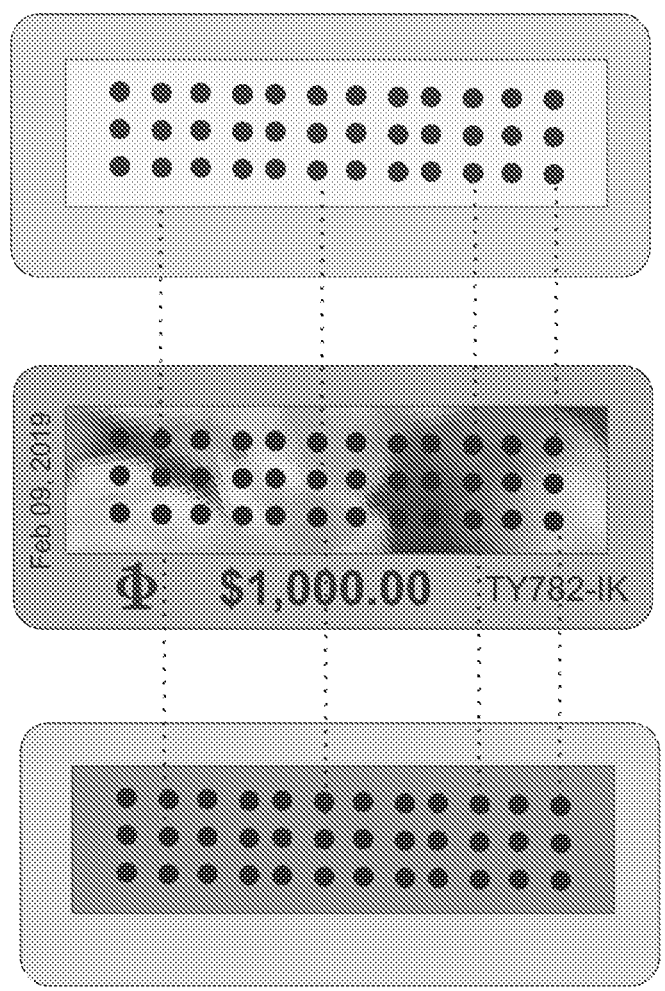

FIG. 11 ρCoin and top and bottom verifier

The figure shows a 2D cut of the top side of the ρCoin with the array of ports shown. A matching Verifier array of pins is shown for both the top and the bottom parts. The ρCoin shows identification of the mint (Φ), the denomination of the coin, ($1,000.00) and the coin id.

Figure 12:
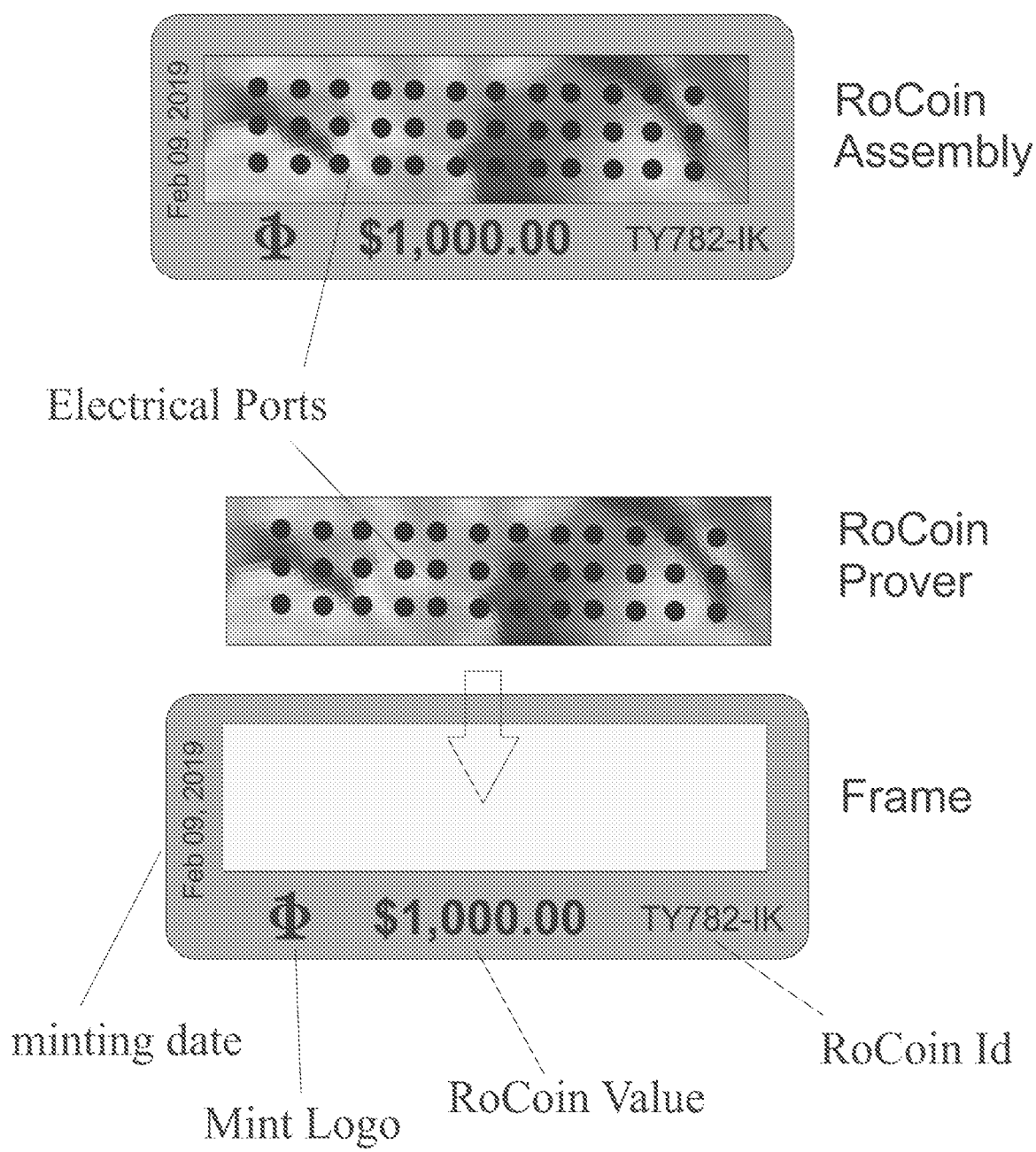

FIG. 12 ρCoin Components

Figure shows the full assembly of the "rock" ("prover") part fitted into the Frame where the mint id, the denomination and the id are marked. Below it shows the parts separated. The "rock" with its ports, and the frame with the space to fit the rock.

Figure 13:
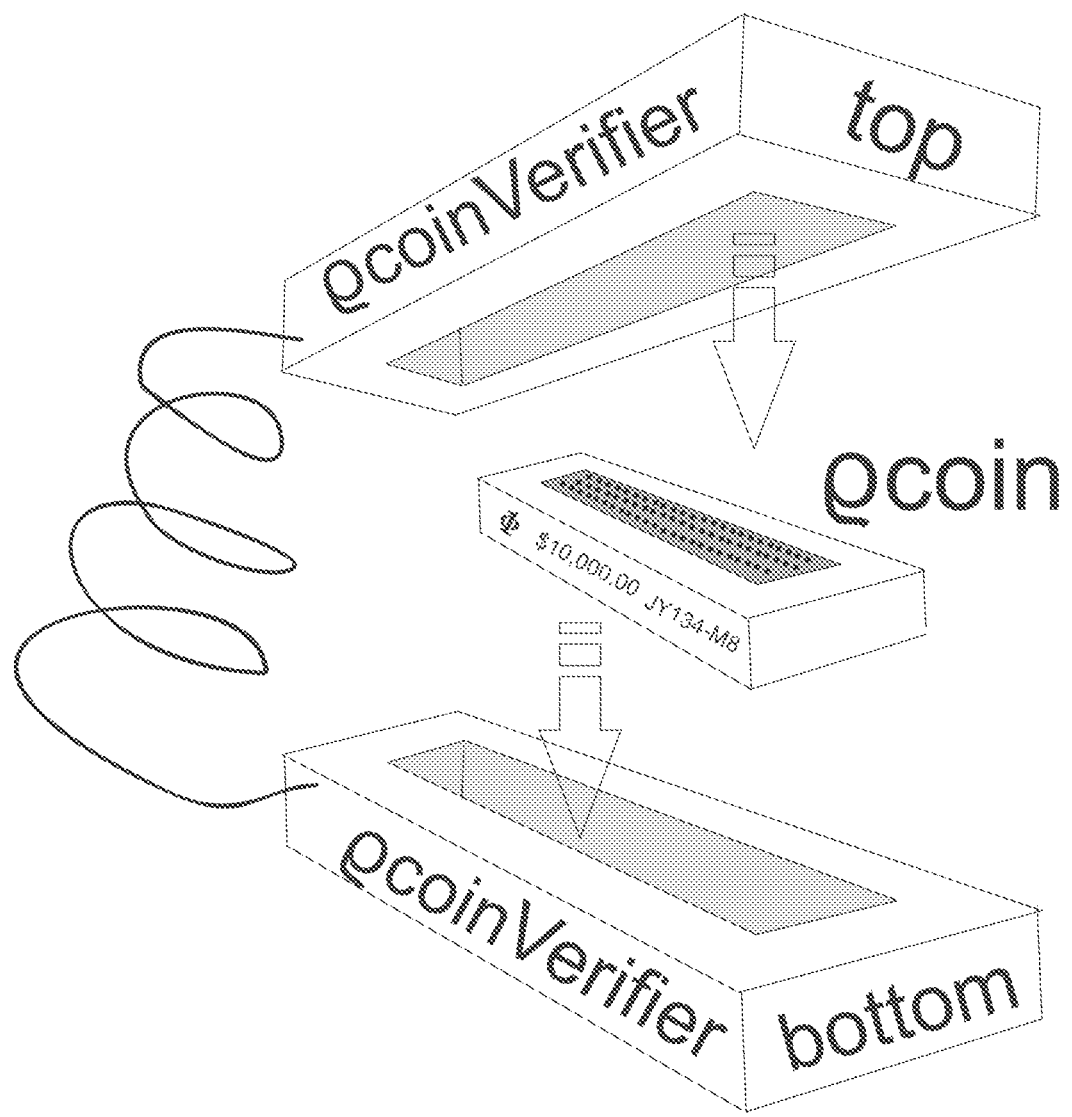

FIG. 13: ρCoin Verifier top and bottom assembly

Figure shows how the two parts of the ρCoin-Verifier are built to house the ρCoin and measure its parameters through the Verifier pin fitting into the Prover rock.

Figure 14:
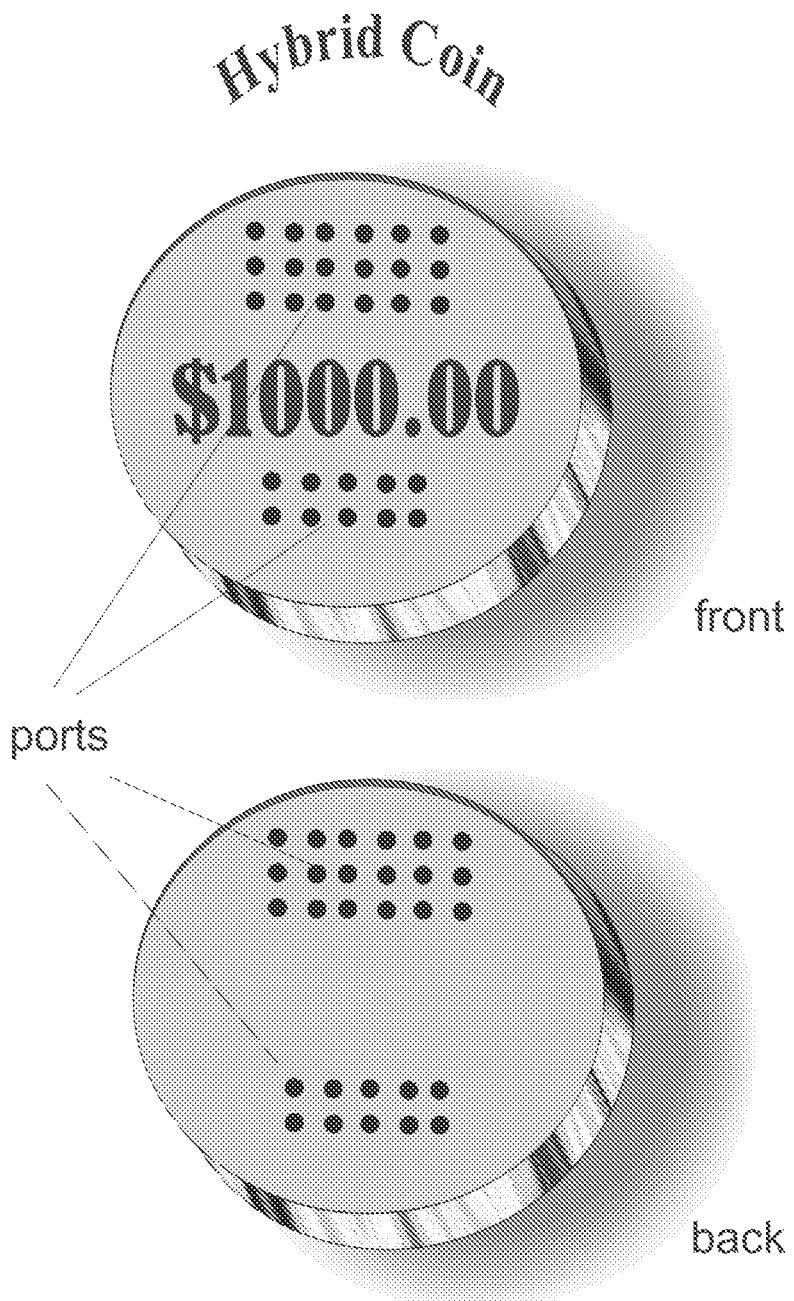

FIG. 14: Hybrid Coin

The figure shows the two faces of a hybrid coin where the shell is built as a "rock of randomness" with ports that allow a ρCoin-Verifier to ascertain the bona fide status of the coin.

Figure 15:
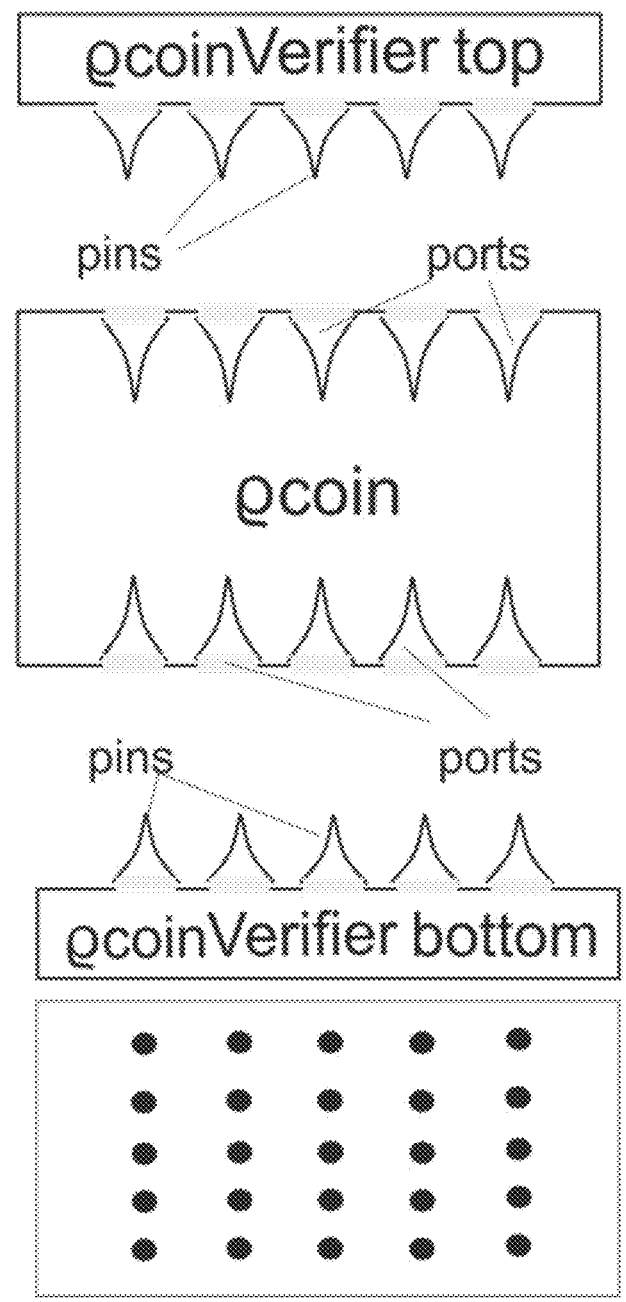

FIG. 15: RockCoin and Verifier Configuration

The figure shows the configuration between the up an down pins arrays of the ρCoin-Verifier and the ports arrays (up and down) of the ρCoin. The bottom part shows the flat view of both the ports and the pins.

Figure 16:
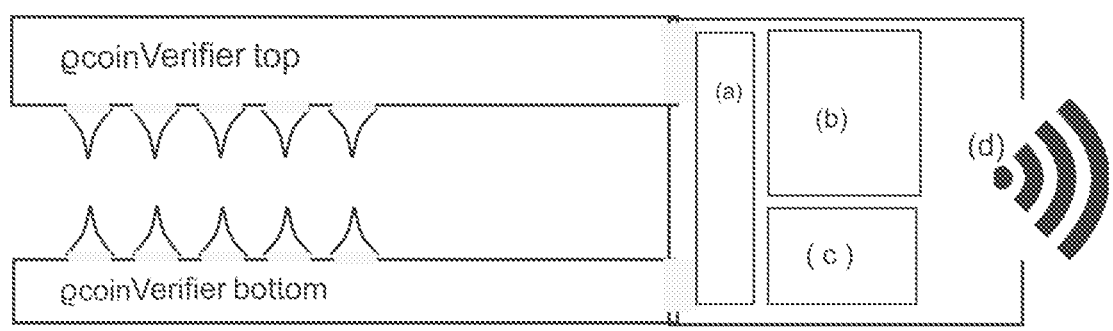

FIG. 16: ρCoin Verifier Components

The figure shows the pin arrays of the verifier (not to scale). It shows schematically component (a) which is the circuitry and the logic that measures the ρCoin fitted for measurements. It runs through the various pin pairs, computes the resistance measurements to a binary string, then accumulates the individual string to the full coin string. It then compares the measurement to the record of that coin in its own (downloaded) copy of the full mintage of the mint. (b). Part (c) represents the dynamic memory where the Verifier logic records activity log and any other measurement parameters. Part (d) is the WiFi section that communicates with the Mint. Not all Verifiers have all the shown components.

Figure 17:
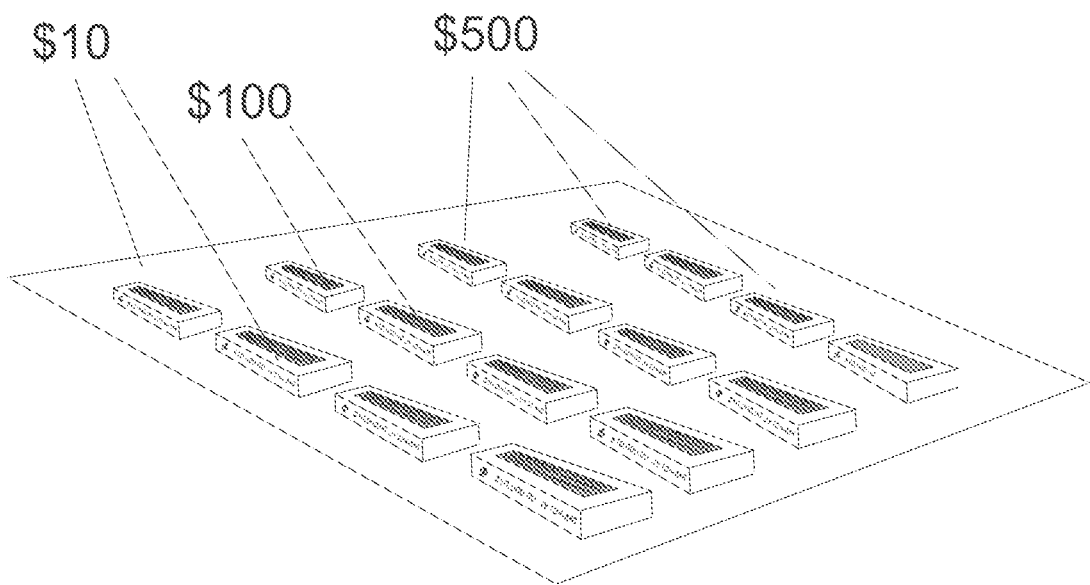

FIG. 17: ρCoin sheet wallet:

The figure shows a sheet where several ρCoins are fitted. Assorted coins of different denominations. Each can be plugged out and paid individually.

Figure 18:
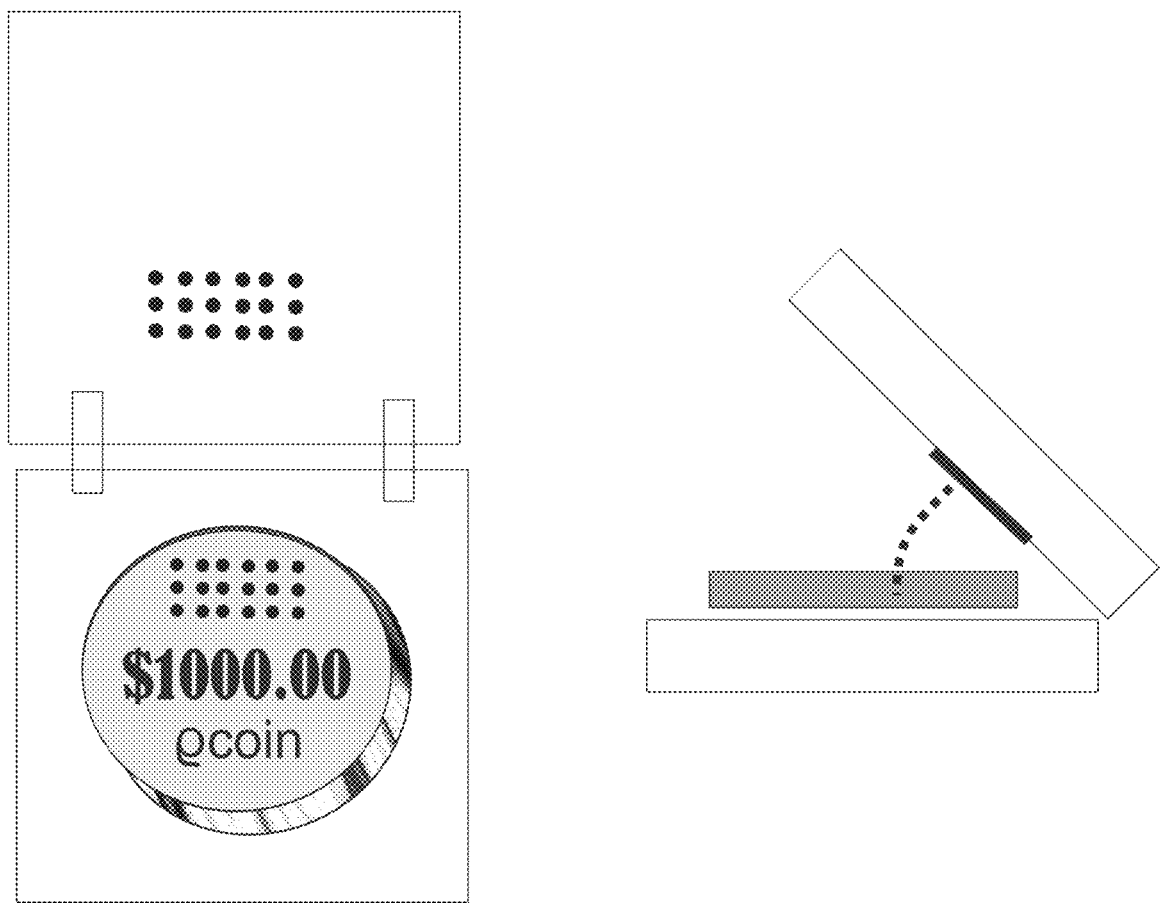

FIG. 18 Ro-Coin in a Verifier Box

This figure shows a $1000 coin housed in a box that contains the electric contact at the inner side of its top. The box can verify the coin with the public ledger of minted coins, which the box has a copy of.

Figure 19:
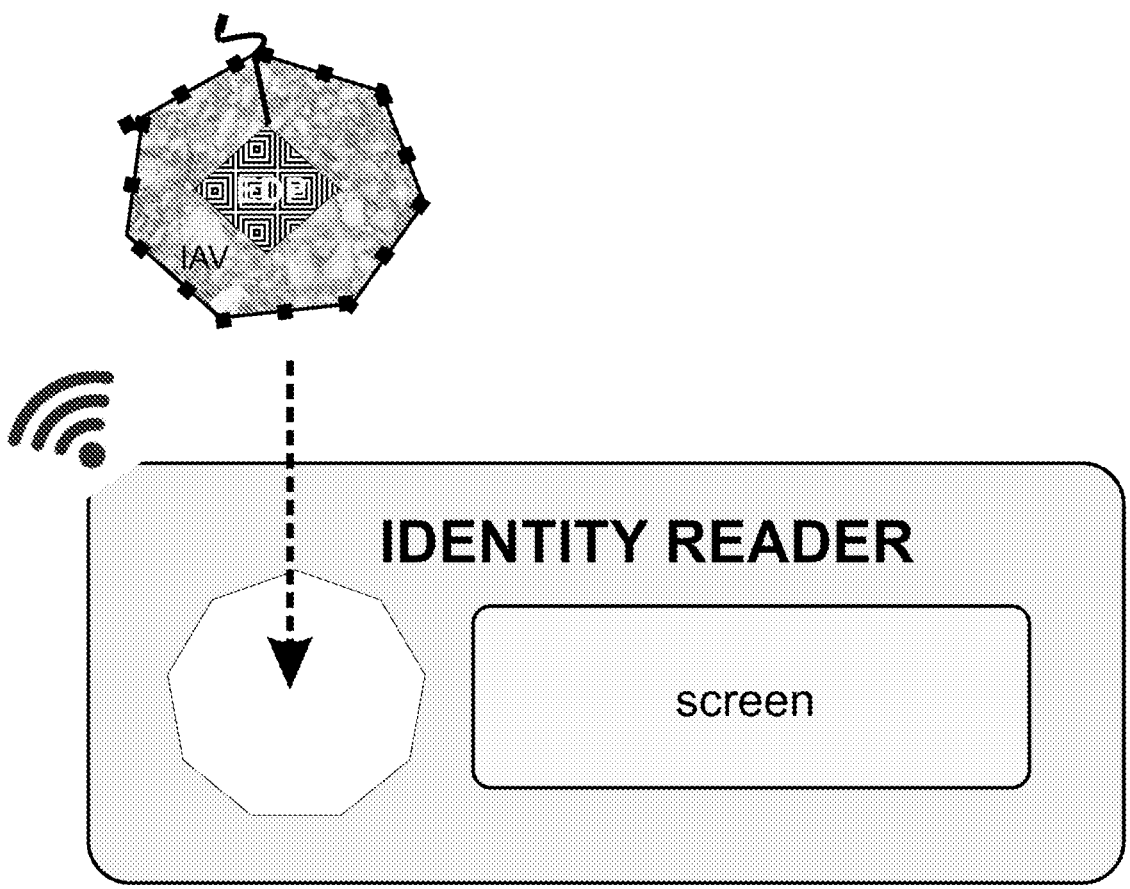

FIG. 19: Identity and Data IVA Authentication

This figure shows at the top a secure envelope (SE) comprised of an enveloped electronic data piece, (EDP), completely surrounded by an IVA such that any attempt to tamper with the IVA will readily be noticed. The EDP is shown with a cord connection to an outside reader. The figure also shows an Identity Reader which has a socket to fit the SE in. The socket is equipped with electronic contacts, to attach to the ports in the IVA in order to measure its properties and compare the result to data kept in a public ledger issued by the IVA manufacturer. The identity reader thereby confirms the authenticity of the IVA, and that trust is then extended to the EDP (the internal electronic data piece), which the reader then reads and receives the information therein with great measure of trust. The reader is optionally equipped with a screen to show the data extracted from the EDP.

Figure 20:
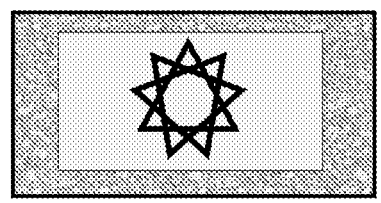
Figure 20:
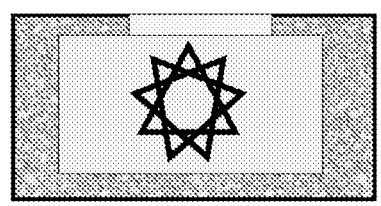
Figure 20:
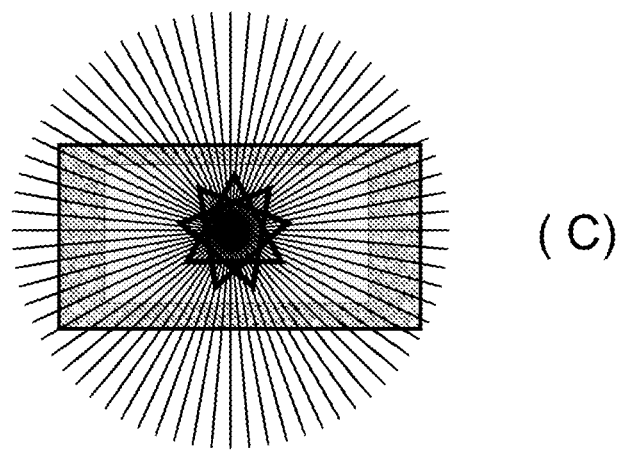

FIG. 20: IVA as a Secure Enclosure

The figures shows the IVA molded as an envelope over a 'payload' an article of value that requires authentication. The integrity of the envelope projects trusts onto the payload. The envelope is authenticated via its IVA properties. In section (b) the IVA is comprised of a window which may be part of the IVA and allows for a visual inspection of the payload. In section (c) the payload is shown to broadcast information outside the secure enclosure.

Figure 21:
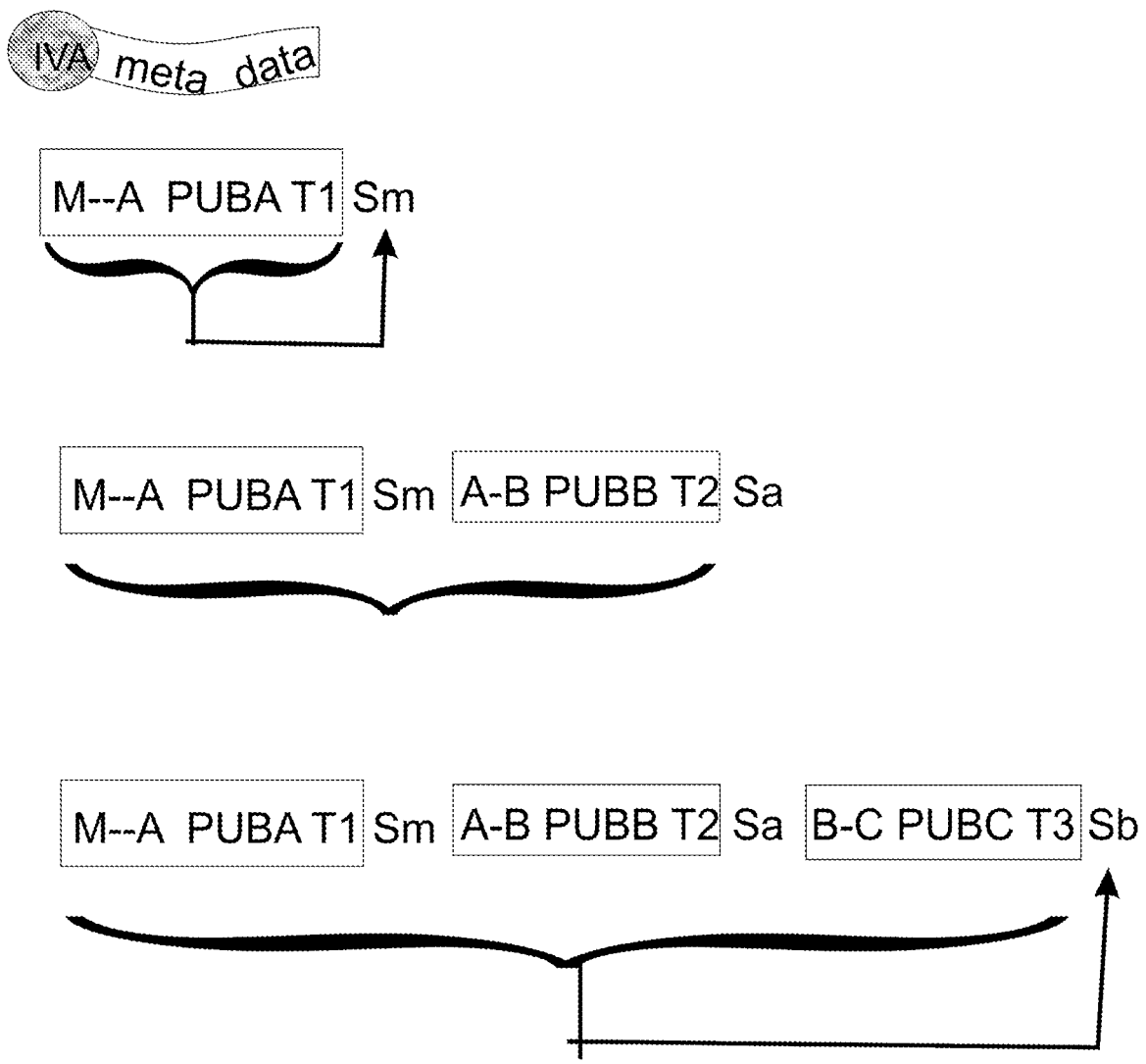

FIG. 21: Tethered IVA Coins

This figure shows chain of custody written in the meta data location of an IVA coin. At the top the mint indicates the transfer of the coin to trader A at time point T1, and writes down the public key of trader A (PUBA). The mint then signs the message with its private key Sm. The coin, now in possession of trader A is being passed to trader B, so trader A writes down that the coin goes to B (A-B), the time of transaction, T2, and the public key of trader B, PUBB. Then trader A signs the entire stretch of meta data with its signature Sa. The next trader, B does the same when passing to trader C as the figure indicates the public key of trader C, PUBC, and the time of the transaction, T3.

Instead of the customary hash signature one could apply the signing method indicated in U.S. patent application Ser. No. 16/505,751 where the meta data is written with the unary alphabet, and the identity of the bits is used to express the signature of the writer. This method will allow for the next trader to indicate that it read the message written by the former trader or the mint.

A BRIEF ENCAPSULATION OF THE INVENTION

The Invention may be presented systems and methods described as follows:

1. A system wherein a lump of matter is comprised of volumes where each volume is filled with a constituent material which has measurable properties which are different in value from the values of the same properties of the constituent materials placed in contiguous volumes, and wherein the values of said properties can be measured by a measuring device outside the lump, and where the measuring device is placed so as to record a reading which is impacted by the values of said properties of each volume in the lump, and wherein the content of each volume is determined by a random input, and thus the integrated reading of the measurement device is a random value.

2. A system wherein the system in claim 1 is manufactured through a manufacturing device which feeds from m constituent materials, each with different values for some of their properties, and where the manufacturing device is setting up the dimensions of volumes, and their respective configuration and where each volume is filled with one of the m constituent materials, wherein the selection of the constituent material for each volume is determined by a random source.

3. A system as in claim 2 wherein the manufacturing device is a 3D printer.

4. A system as in claim 1 wherein a measured property of the constituent materials is electrical conductivity, and where the surface of the lump is fitted with n electrical contact points, "ports", to which an electrical potential can be applied, and where the integrated measurement of the conductivity of the lump as a whole is measured by reading the current that flows between p<n connected ports with an electrical potential of $v_p$, and another group of connected q≤n-p ports where the electric potential is set to $v_q<v_p$, and where the resultant electric current, I, between the p group of ports and the q group of ports is used in computing the integrated resistance of the lump $R(p,q)=(v_p-v_q)/I$.

5. A method for using the system in claim 4 where the choice of the p ports and the choice of the q ports is changed many times, and each time the respective integrated resistance, R, is measured, and the value of R is expressed as binary string, and these strings are concatenated to form a long string which reflects the randomness used to build the lump through random choice of which material will be used for each set volume of the lump.

6. A system as in claim 1 where the lump is assigned a lump identity, and is measured in t different ways, and each measurement reflects the randomness used to construct the lump, and where the t results of these measurements are published to a community, wherein one member of the community holding such a lump can pass it to another member of the community, claiming the lump to be authentic, and where the recipient of the lump will be able to conduct the specified t measurements of the lump, and compare the results of his measurements to the published results for that lump ID, and when the results agree, the recipient concludes that the tested lump is the one manufactured by the claimed manufacturer and is not a fraud.

7. A system as in claim 1 wherein the lump is constructed as an envelope around an electronic data piece, EDP, and wherein the envelope cannot be separated from the EDP without (i) being visibly deformed, and (ii) without affecting the readings of the properties of the lump; and wherein upon determining the authenticity of the envelope through t measurements, the trust in the authenticity of the lump is extended to the electronic data piece and to the data written there.

8. A system as in claim 7 wherein the lump is assigned (i) an id tag, and (ii) a monetary value, which turns the lump into a coin, which can be paid with confidence because the payee will measure the coin t times, and accept the coin as authentic if the t measurements agree with the expected measurements which are published by the mint of that coin.

9. A system as in claim 8, wherein a coin logger is constructed with a place to fit the coin, carry out the t measurements, authenticate the coin, read the data in the electronic data piece, thereby read coin-related information, for example: terms of trade and redemption of this coin.

10. A system, as in claim 9, wherein the traders can write information to the electronic data piece and thereby record among other matters, the chain of custody of the coin.

11. A system as in claim 10 where the mint of the coin writes down the identity of the trader to whom the coin is passed, and identifies the time of the passing of the coin, as well as the public key of that trader, then signing all this information with its own private key, while publishing its respective public key, and wherein the trader to whom the coin was passed, passes it to a second trader, specifying the time of this second passing of the coin, and indicating the public key of the second trader, then signing the entire chain of transactional data with his private key, which corresponds to the public key identified by the mint, and where the second trader passes the coin to the next trader, indicating the time of passing and the public key of the next trader, then signs the entire chain of transactional data with his private key; thereby writing a chain of custody of the coin, identifying who owned the coin and when.

12. The method as in claim 7 wherein the EDP is replaced with an article of value, the authenticity of which is accepted when the enveloping lump is authenticated, and the envelope may be fitted with a window to allow visual inspection of the authenticated article of value.

What is claimed is:

1. A three-dimensional (3D) electrical device that provides a different measured electrical resistance between any two mutually exclusive groups of points (a group P comprised of p points, and a group Q comprised of q points) on the device, which is marked with a plurality of n points where n≥p+q, and where the points in group P are connected to one pole of a battery, and the points in group Q are connected to the opposite pole of the battery, the device comprising:

a plurality of 3D blocks, wherein each block of the plurality of 3D blocks has a different electrical conductivity, is made up of one or more materials, and is selected in a random order and connected to a previously selected block of the plurality of 3D blocks to form a larger 3D shape so that a different electrical conductivity is produced between any two groups (P and Q) of mutually exclusive points of the plurality of points on at least one surface of the 3D shape; and a plurality of electrodes placed on the at least one surface of the 3D shape so that each electrode of the plurality of electrodes is connected to a point of the plurality of points in order to enable a measurement of electrical resistance between any two groups of electrodes of the plurality of electrodes.

2. The device of claim 1 wherein the device is manufactured through a manufacturing device which feeds from m constituent materials, each with different value of electrical conductivity, and where the manufacturing device is setting up the dimensions of, each block in the plurality of blocks, and their respective configuration, and where each block is filled with one of the m constituent materials, wherein the selection of the constituent material for each block is determined by a random source.

3. The manufacturing device of claim 2 wherein the manufacturing device is a 3D printer.

4. The device of claim 1 where the device is assigned a device identity, which is also marked (tagged) on the device; and where the device is measured in t different ways, wherein each way is defined by a particular selection of groups P and Q, and each measurement of electrical resistance reflects the randomness used to construct the device, and where the t results of these measurements are published to a community, wherein one member of the community holding such a device can pass it to another member of the community, claiming the device to be authentic per its marked identity tag, and where the recipient of the device will conduct the specified t measurements of the device, and compare the results of these measurements to the published results for that device ID, and if the results agree, the recipient concludes that the tested device is the one so tagged by its manufacturer.

5. The device of claim 1 wherein the device is constructed as an envelope around an electronic data piece, EDP, and wherein the envelope cannot be separated from the EDP without (i) being visibly deformed, and (ii) without affecting the readings of the electrical resistance measurements between points on the device; and wherein upon determining the authenticity of the envelope through t measurements, the trust in the authenticity of the device is extended to the electronic data piece and to the data written there.

6. The device of claim 5 wherein the device is assigned (i) an identity tag, and (ii) a monetary value, which turns the device into a coin, which can be paid with confidence because the payee will measure the coin t times, and accept the coin as authentic if the t measurements agree with the expected measurements which are published by the mint of that coin (the device manufacturer).

7. The device of claim 6, wherein a coin logger is constructed with a place to fit the coin, carry out the t measurements, authenticate the coin, and read the data in the electronic data piece, thereby read coin-related information, in particular terms of trade and redemption of the coin.

8. The device of claim 7, wherein the traders of the coin can write information to the electronic data piece and thereby record among other matters, the chain of custody of the coin.

9. The device of claim 7 where the mint of the coin writes down the identity of the trader to whom the coin is originally passed, and identifies the time of the passing of the coin, as well as the public key of that trader, then signing all this information with its own private key, while publishing its respective public key, and wherein the trader to whom the coin was passed, passes it to a second trader, specifying the time of this second passing of the coin, and indicating the public key of the second trader, then signing the entire chain of transactional data with his private key, which corresponds to the public key identified by the mint, and where the second trader passes the coin to the next trader, indicating the time of passing and the public key of the next trader, then the passing trader signs the entire chain of transactional data with his private key; thereby writing a chain of custody of the coin, identifying who owned the coin and when.

10. The device of claim 5 wherein the EDP is replaced with an article of value, the authenticity of which is accepted when the enveloping device is authenticated, and the envelope may be fitted with a window to allow visual inspection of the authenticated article of value.

\* \* \* \* \*